(12) United States Patent
Sato

(10) Patent No.: US 7,492,526 B2
(45) Date of Patent: Feb. 17, 2009

(54) HIGH ZOOM RATIO ZOOM LENS, OPTICAL APPARATUS USING THE SAME, AND METHOD FOR VARYING FOCAL LENGTH

(75) Inventor: Susumu Sato, Yotsukaido (JP)

(73) Assignee: Nikon Corporation, Tokyo (JP)

( * ) Notice: Subject to any disclaimer, the term of this patent is extended or adjusted under 35 U.S.C. 154(b) by 19 days.

(21) Appl. No.: 11/878,131

(22) Filed: Jul. 20, 2007

(65) Prior Publication Data

US 2008/0106798 A1 May 8, 2008

(30) Foreign Application Priority Data

Jul. 27, 2006 (JP) .............................. 2006-205029

(51) Int. Cl.
*G02B 15/14* (2006.01)

(52) U.S. Cl. ....................... 359/687; 359/715; 359/740; 359/774; 359/557

(58) Field of Classification Search ................ 359/687, 359/715, 740, 774, 557
See application file for complete search history.

(56) References Cited

U.S. PATENT DOCUMENTS

| | | | |
|---|---|---|---|
| 6,441,968 B1 * | 8/2002 | Okayama et al. | ............ 359/687 |
| 6,650,475 B1 * | 11/2003 | Hamano | ...................... 359/557 |
| 7,139,131 B2 | 11/2006 | Nanba et al. | |
| 7,253,964 B2 | 8/2007 | Muratani | |
| 7,253,965 B2 * | 8/2007 | Shibayama et al. | .......... 359/687 |
| 2006/0056053 A1 * | 3/2006 | Muratani | ..................... 359/687 |
| 2007/0070524 A1 | 3/2007 | Sato | |

FOREIGN PATENT DOCUMENTS

JP          2005-257868 A      9/2005

* cited by examiner

*Primary Examiner*—Evelyn A. Lester
(74) *Attorney, Agent, or Firm*—Miles & Stockbridge P.C.

(57) ABSTRACT

A high-zoom-ratio zoom lens having superb optical performance despite compactness and a high zoom ratio. The lens includes, in order from an object, a first group having positive power; a second group having negative power; a third group having positive power; and a fourth group having positive power. The third group includes, in order from the object, a first positive lens having a convex surface facing the object, a second positive lens having a convex surface facing the object, a double concave negative lens having a radius of curvature of the image side surface smaller than that of the object side surface, and a third positive lens having a double convex shape. Any of lens surfaces composing the third group is an aspherical surface. Upon zooming from a wide-angle end to a telephoto end, all groups moving along the optical axis. Given condition is satisfied.

22 Claims, 30 Drawing Sheets

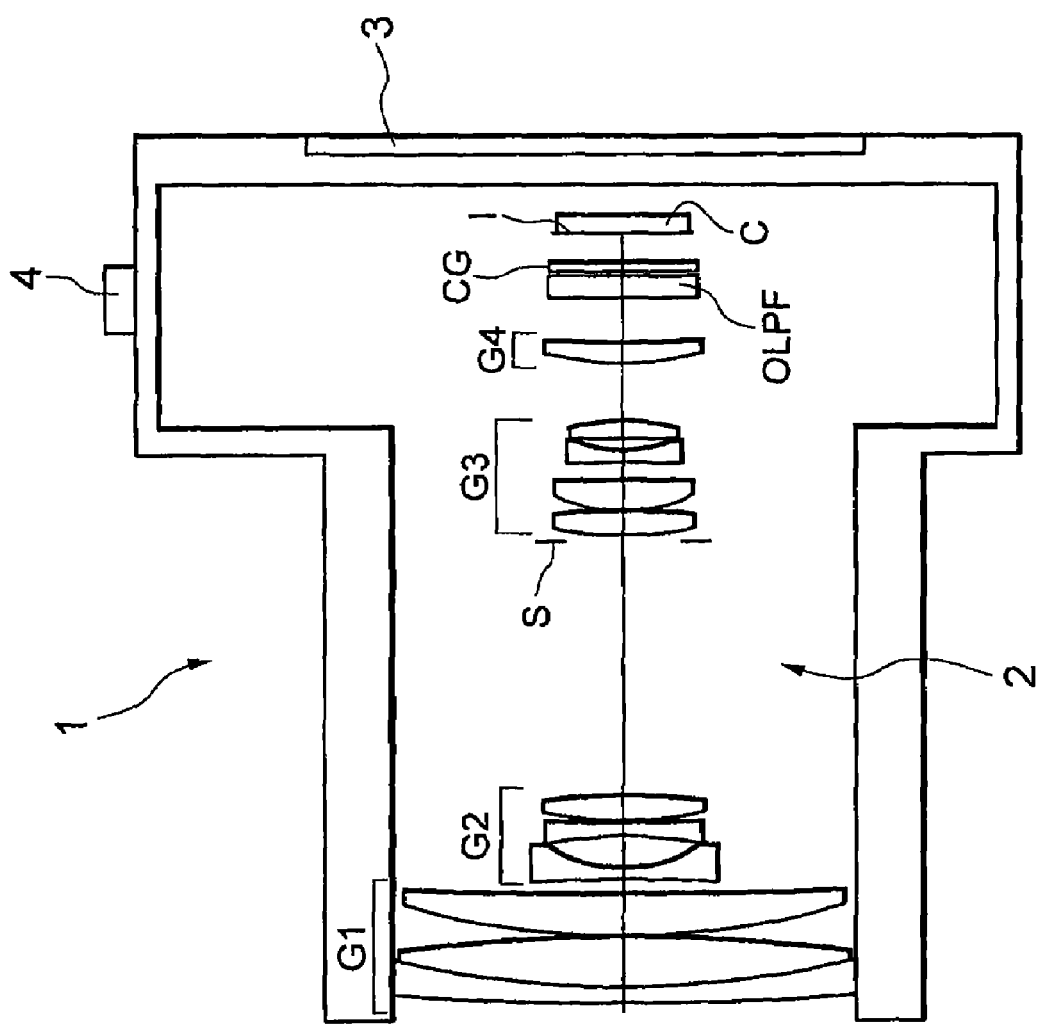

HIGH ZOOM RATIO ZOOM LENS, OPTICAL APPARATUS USING THE SAME, AND METHOD FOR VARYING FOCAL LENGTH

The disclosure of the following priority application is herein incorporated by reference:
Japanese Patent Application No. 2006-205029 filed on Jul. 27, 2006.

BACKGROUND OF THE INVENTION

1. Field of the Invention

The present invention relates to a high-zoom-ratio zoom lens, an optical apparatus using the zoom lens, and a method for varying the focal length of the zoom lens.

2. Related Background Art

There have been proposed high-zoom-ratio zoom lenses suitable for an electronic still camera and the like (for example, Japanese Patent Application Laid Open No. 2005-257868).

In a conventional high-zoom-ratio zoom lens, since a first lens group and a third lens group are fixed with respect to an image plane upon varying a state of the focal length from a wide-angle end state to a telephoto end state, refractive power of a second lens group is necessary to be strong, so that variation in longitudinal chromatic aberration becomes large.

SUMMARY OF THE INVENTION

The present invention is made in view of the aforementioned problems and has an object to provide a high-zoom-ratio zoom lens having superb optical performance though it is compact, an optical apparatus using the zoom lens, and a method for varying a focal length of the zoom lens.

According to a first aspect of the present invention, there is provided a high-zoom-ratio zoom lens consisting of, in order from an object: a first lens group having positive refractive power; a second lens group having negative refractive power; a third lens group having positive refractive power; and a fourth lens group having positive refractive power, the third lens group including, in order from the object, a first positive lens having a convex surface facing the object, a second positive lens having a convex surface facing the object, a double concave negative lens having an absolute value of a radius of curvature of the image side surface smaller than that of the object side surface, and a third positive lens having a double convex shape, upon varying a focal length from a wide-angle end state to a telephoto end state, all lens groups being moved along an optical axis, and the following conditional expression being satisfied:

$$1.87 < N33 < 2.20$$

where N33 denotes refractive index of the negative lens at d-line, in which the wavelength $\lambda = 587.6$ nm.

According to a second aspect of the present invention, there is provided an optical apparatus using the high-zoom-ratio zoom lens according to the first aspect.

According to a third aspect of the present invention, there is provided a method for varying a focal length of a high-zoom-ratio zoom lens, the method includes steps of: providing the high-zoom-ratio zoom lens consisting of, in order from an object, a first lens group having positive refractive power, a second lens group having negative refractive power, a third lens group having positive refractive power, and a fourth lens group having positive refractive power; providing the third lens group including, in order from the object, a first positive lens having a convex surface facing the object, a second positive lens having a convex surface facing the object, a double concave negative lens having an absolute value of a radius of curvature of the image side surface smaller than that of the object side surface, and a third positive lens having a double convex shape; satisfying the following conditional expression:

$$1.87 < N33 < 2.20$$

where N33 denotes refractive index of the negative lens at d-line, in which the wavelength $\lambda = 587.6$ nm; and varying a focal length from a wide-angle end state to a telephoto end state by moving all lens groups along an optical axis.

According to the present invention, it becomes possible to provide a high-zoom-ratio zoom lens having superb optical performance though it is compact, an optical apparatus using the zoom lens, and a method for varying the focal length of the zoom lens.

BRIEF DESCRIPTION OF THE DRAWINGS

FIGS. 1A and 1B are diagrams showing an electronic still camera which is equipped with a high-zoom-ratio zoom lens according to the present embodiment explained later, in which FIG. 1A is a front view and FIG. 1B is a rear view.

FIG. 2 is a cross-sectional view along the A-A line in FIG. 1A.

FIGS. 4A, 4B and 4C are graphs showing various aberrations of the high-zoom-ratio zoom lens according to Example 1 upon focusing on infinity and lateral aberration upon vibration reduction, in which FIG. 4A shows in a wide-angle end state, FIG. 4B shows in an intermediate focal length state, and FIG. 4C shows in a telephoto end state.

FIGS. 5A, 5B and 5C are graphs showing various aberrations of the high-zoom-ratio zoom lens according to Example 1 upon focusing on close-range object and lateral aberration upon vibration reduction, in which FIG. 5A shows in a wide-angle end state where the distance between the object and the image plane Rw=113 mm, FIG. 5B shows in an intermediate focal length state where the distance between the object and the image plane Rm=328 mm, and FIG. 4C shows in a telephoto end state where the distance between the object and the image plane Rt=594 mm.

FIGS. 7A, 7B and 7C are graphs showing various aberrations of the high-zoom-ratio zoom lens according to Example 2 upon focusing on infinity, in which FIG. 7A shows in a wide-angle end state, FIG. 7B shows in an intermediate focal length state, and FIG. 7C shows in a telephoto end state.

FIGS. 8A, 8B and 8C are graphs showing various aberrations of the high-zoom-ratio zoom lens according to Example 2 upon focusing on close-range object, in which FIG. 8A shows in a wide-angle end state where the distance between the object and the image plane Rw=114 mm, FIG. 8B shows in an intermediate focal length state where the distance between the object and the image plane Rm=328 mm, and FIG. 8C shows in a telephoto end state where the distance between the object and the image plane Rt=595 mm.

FIGS. 10A, 10B and 10C are graphs showing various aberrations of the high-zoom-ratio zoom lens according to Example 3 upon focusing on infinity, in which FIG. 10A shows in a wide-angle end state, FIG. 10B shows in an intermediate focal length state, and FIG. 10C shows in a telephoto end state.

FIGS. 11A, 11B and 11C are graphs showing various aberrations of the high-zoom-ratio zoom lens according to Example 3 upon focusing on close-range object, in which FIG. 11A shows in a wide-angle end state where the distance between the object and the image plane Rw=114 mm, FIG. 11B shows in an intermediate focal length state where the distance between the object and the image plane Rm=329 mm, and FIG. 11C shows in a telephoto end state where the distance between the object and the image plane Rt=595 mm.

FIGS. 13A, 13B and 13C are graphs showing various aberrations of the high-zoom-ratio zoom lens according to Example 4 upon focusing on infinity, in which FIG. 13A shows in a wide-angle end state, FIG. 13B shows in an intermediate focal length state, and FIG. 13C shows in a telephoto end state.

FIGS. 14A, 14B and 14C are graphs showing various aberrations of the high-zoom-ratio zoom lens according to Example 4 upon focusing on close-range object, in which FIG. 14A shows in a wide-angle end state where the distance between the object and the image plane Rw=114 mm, FIG. 14B shows in an intermediate focal length state where the distance between the object and the image plane Rm=329 mm, and FIG. 14C shows in a telephoto end state where the distance between the object and the image plane Rt=595 mm.

DETAILED DESCRIPTION OF THE MOST PREFERRED EMBODIMENT

An embodiment of the present invention is explained below.

Figure 1A:
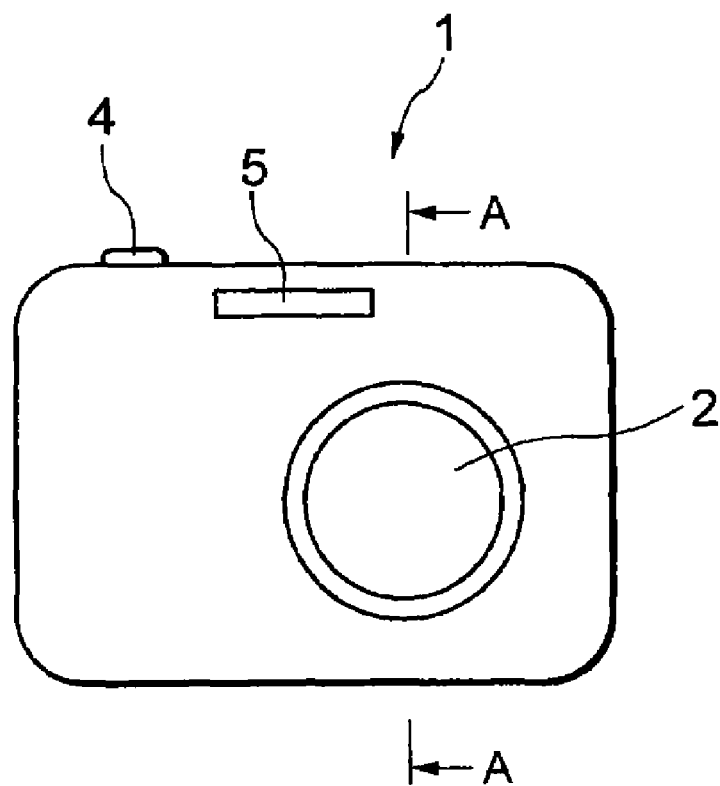
Figure 1B:
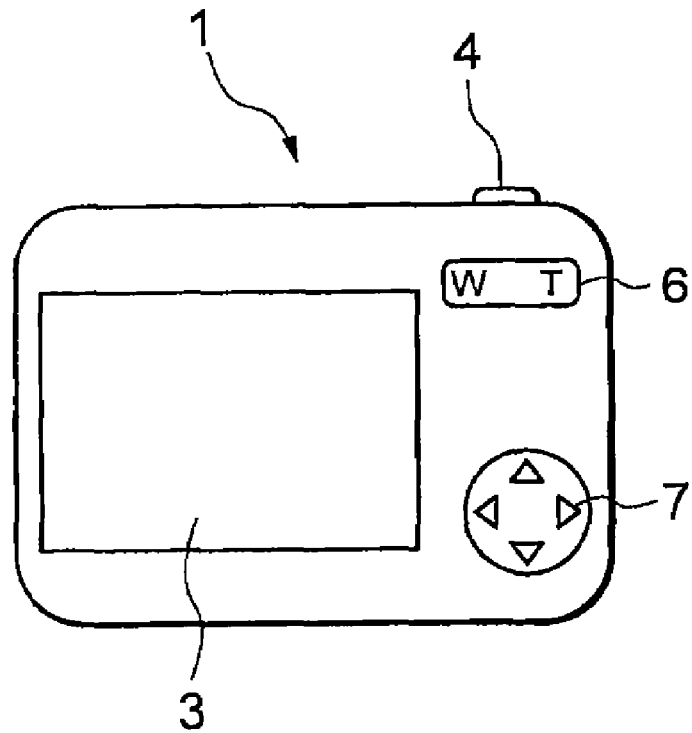

FIGS. 1A and 1B are diagrams showing an electronic still camera equipped with a high-zoom-ratio zoom lens according to a present embodiment, which is explained later, in which FIG. 1A is a front view and FIG. 1B is a rear view. FIG. 2 is a cross-sectional view along the A-A line in FIG. 1A.

In an electronic still camera 1 according to the present embodiment shown in FIGS. 1A, 1B and 2, when a power switch button (not shown) is pressed, a shutter (not shown) is opened and light from a subject (not shown) is collected by an image-taking lens 2 and an image is formed on an imaging device C (such as CCD, CMOS, and the like) disposed on an image plane I. The subject image formed on the imaging device C is displayed on a liquid crystal monitor 3 disposed backside of the electronic still camera 1. After fixing the composition of the subject image with observing the liquid crystal monitor 3, a photographer depresses a release button 4 to take a picture of the subject image by the imaging device C, and stores in a memory (not shown).

The image-taking lens 2 is composed of a high-zoom-ratio zoom lens 2 according to the present embodiment explained later. Moreover, in the electronic still camera 1, there are disposed such that an auxiliary light emitter 5 that emits auxiliary light when the subject is dark, a W-T button 6 that makes the zoom lens 2, which is the image-taking lens 2, zoom from a wide-angle end state (W) to a telephoto end state (T), and a function button 7 that is used for setting various conditions of the electronic still camera 1.

In the electronic still camera 1 according to the present embodiment, it becomes possible to carry out vibration reduction when the photo-taking lens 2 has a vibration reduction function.

In this manner, the electronic still camera 1 equipped with the high-zoom-ratio zoom lens 2 according to the present embodiment explained later is composed.

Then basic construction of a high-zoom-ratio zoom lens according to the present embodiment is explained below.

The basic construction of a high-zoom-ratio zoom lens according to the present embodiment consists of, in order from an object, a first lens group having positive refractive power, a second lens group having negative refractive power, a third lens group having positive refractive power, and a fourth lens group having positive refractive power.

The third lens group includes, in order from the object, a first positive lens having a convex surface facing the object, a second positive lens having a convex surface facing the object, a double concave negative lens having a radius of curvature of the image side surface smaller than that of the object side surface, and a third positive lens having a double convex shape, and any of lens surfaces composing the third lens group is an aspherical surface.

All lens groups are moved along an optical axis upon varying a focal length from a wide-angle end state to a telephoto end state.

In order to design a zoom lens to become a high zoom ratio, a distance along the optical axis between the first lens group, which is a light-collecting lens group, and the second lens group, which is a varying-focal-length lens group, has to be secured sufficiently wide. Accordingly, a distance along the optical axis between the first lens group and the third lens group is also necessary to be secured sufficiently wide. Then, when the third lens group is configured as a telephoto type, the principal point can be disposed near to the object side, so that it becomes possible to secure the distance between the first lens group and the third lens group sufficiently wide.

Since the third lens group is a telephoto type, strong negative power is disposed to the image side. In a high-zoom-ratio zoom lens according to the present embodiment, since the lens that bears negative refractive power is only the negative lens having a double concave shape in the third lens group, the radius of curvature of the negative lens tends to become small. As a result, coma in the telephoto end state tends to become large. Accordingly, in order to make the radius of curvature large, the negative lens in the third lens group is necessary to be made from a glass material having suitable refractive index. Therefore, the following conditional expression (1) is preferably satisfied:

$$1.87 < N33 < 2.20 \tag{1}$$

where N33 denotes refractive index of the negative lens in the third lens group at d-line (wavelength λ=587.6 nm).

Conditional expression (1) defines an appropriate range of refractive index of the negative lens in the third lens group. When the value N33 is equal to or falls below the lower limit of conditional expression (1), coma in the telephoto end state becomes large, so that it is undesirable. When the value N33 is equal to or exceeds the upper limit of conditional expression (1), lateral chromatic aberration in the wide-angle end state becomes large, so that it is undesirable.

In order to secure the effect of the present embodiment, it is preferable to set the lower limit of conditional expression (1) to 1.90. In order to secure the effect of the present embodiment, it is preferable to set the upper limit of conditional expression (1) to 2.05.

In a high-zoom-ratio zoom lens according to the present embodiment, the following conditional expression (2) is preferably satisfied:

$$22 < v33 < 39 \quad (2)$$

where v33 denotes Abbe number of the negative lens in the third lens group at d-line (wavelength λ=587.6 nm).

Conditional expression (2) defines an appropriate range of Abbe number of the negative lens in the third lens group. When the value v33 is equal to or falls below the lower limit of conditional expression (2), lateral chromatic aberration in the wide-angle end state becomes large, so that it is undesirable. When the value v33 is equal to or exceeds the upper limit of conditional expression (2), coma in the telephoto end state becomes large, so that it is undesirable.

In order to secure the effect of the present embodiment, it is preferable to set the lower limit of conditional expression (2) to 25. In order to secure the effect of the present embodiment, it is preferable to set the upper limit of conditional expression (2) to 36.

In a high-zoom-ratio zoom lens according to the present embodiment, in order to construct the third lens group as a telephoto type, the first positive lens and the second positive lens in the third lens group inevitably have large refractive power, and are necessary to be suitable shapes so as to provide good aberration correction. Then, the following conditional expression (3) is preferably satisfied:

$$-0.30 < Ra/Rb < 0.10 \quad (3)$$

where Ra denotes a radius of curvature of the object side lens surface of the first positive lens in the third lens group, and Rb denotes a radius of curvature of the image side lens surface of the first positive lens in the third lens group.

Conditional expression (3) defines an appropriate range of the shape of the first positive lens in the third lens group. When the ratio Ra/Rb is equal to or falls below the lower limit of conditional expression (3), spherical aberration becomes large in the negative direction, so that it is undesirable. On the other hand, when the ratio Ra/Rb is equal to or exceeds the upper limit of conditional expression (3), variation in curvature of field upon zooming becomes large, so that it is undesirable.

In order to secure the effect of the present embodiment, it is preferable to set the lower limit of conditional expression (3) to -0.27. In order to secure the effect of the present embodiment, it is preferable to set the upper limit of conditional expression (3) to 0.05.

In a high-zoom-ratio zoom lens according to the present embodiment, the following conditional expression (4) is preferably satisfied:

$$-0.30 < Rc/Rd < 0.10 \quad (4)$$

where Rc denotes a radius of curvature of the object side surface of the second positive lens in the third lens group, and Rd denotes a radius of curvature of the image side surface of the second positive lens in the third lens group.

Conditional expression (4) defines an appropriate range of the shape of the second positive lens in the third lens group. When the ratio Rc/Rd is equal to or falls below the lower limit of conditional expression (4), spherical aberration becomes large in the negative direction, so that it is undesirable. When the ratio Rc/Rd is equal to or exceeds the upper limit of conditional expression (4), variation in curvature of field upon zooming becomes large, so that it is undesirable.

In order to secure the effect of the present embodiment, it is preferable to set the lower limit of conditional expression (4) to -0.27. In order to secure the effect of the present embodiment, it is preferable to set the upper limit of conditional expression (4) to 0.05.

In a high-zoom-ratio zoom lens according to the present embodiment, it is desirable that the second lens group includes, in order from the object, a first negative lens with a double concave shape having an absolute value of a radius of curvature of the image side lens surface smaller than that of the object side lens surface, a second negative lens having a concave surface facing the object, and a double convex positive lens, and any of lens surfaces composing the second lens group is an aspherical surface.

In order to accomplish a high zoom ratio and miniaturization of the total lens length, a moving amount of the second lens group along the optical axis is necessary to be small. Accordingly, in order to make the longitudinal magnification of the second lens group large, a focal length of the first lens group has to be small. In this case, in order to keep evenness of the image plane, which is a basic configuration of an optical system, Petzval sum of the whole lens system may be set appropriately. Accordingly, the focal length of the second lens group is made small in response to making the focal length of the first lens group small.

Although the measure to make the focal length of the second lens group small secures evenness of the image plane in the paraxial ray theory, it shows an adverse effect on aberrations caused by bending of the lens surfaces. In other words, since refractive power of the second lens group has already become strong and the radius of curvature of the concave lens surface has become small, aberrations are excessively generated as the incident ray approaches the periphery of the lens.

With constructing the second lens group as described above, it becomes possible to excellently correct aberrations caused by bending of the lens surfaces.

In a high-zoom-ratio zoom lens according to the present embodiment, in order to weaken refractive power of the first negative lens in the second lens group, which makes the highest contribution in the second lens group to the flatness of the image plane, it is preferable that an absolute value of a radius of curvature of the object side surface of the second negative lens is smaller than that of the image side surface of the second negative lens. Specifically, the following conditional expression (5) is preferably satisfied:

$$-0.30 < Re/Rf < 0.40 \quad (5)$$

where Re denotes a radius of curvature of the object side surface of the second negative lens, and Rf denotes a radius of curvature of the image side surface of the second negative lens.

Conditional expression (5) defines an appropriate range of the shape of the second negative lens in the second lens group. When the ratio Re/Rf is equal to or falls below the lower limit of conditional expression (5), coma in the wide-angle end state tends to become large, so that it is undesirable. On the other hand, when the ratio Re/Rf is equal to or exceeds the upper limit of conditional expression (5), spherical aberration becomes large in the negative direction, so that it is undesirable.

In order to secure the effect of the present embodiment, it is preferable to set the lower limit of conditional expression to −0.25. In order to secure the effect of the present embodiment, it is preferable to set the upper limit of conditional expression to 0.30.

In a high-zoom-ratio zoom lens according to the present embodiment, it is preferable that by increasing the radius of curvature of the first negative lens in the second lens group, generation of aberrations in the periphery of the lens is reduced. Specifically, the following conditional expression (6) is preferably satisfied:

$$1.820 < N21 < 1.920 \quad (6)$$

where N21 denotes refractive index of the first negative lens in the second lens group at d-line (wavelength λ=587.6 nm).

Conditional expression (6) defines an appropriate range of refractive index of the first negative lens in the second lens group. When the value N21 is equal to or falls below the lower limit of conditional expression (6), curvature of field in the intermediate focal length state becomes large, so that it is undesirable. On the other hand, when the value N21 is equal to or exceeds the upper limit of conditional expression (6), lateral chromatic aberration in the wide-angle end state becomes large, so that it is undesirable.

In order to secure the effect of the present embodiment, it is preferable to set the lower limit of conditional expression (6) to 1.845. In order to secure the effect of the present embodiment, it is preferable to set the upper limit of conditional expression (6) to 1.905.

In a high-zoom-ratio zoom lens according to the present embodiment, the following conditional expression (7) is preferably satisfied:

$$33 < \nu21 < 44 \quad (7)$$

where ν21 denotes Abbe number of the first negative lens in the second lens group at d-line (wavelength λ=587.6 nm).

Conditional expression (7) defines an appropriate range of Abbe number of the first negative lens in the second lens group. When the value ν21 is equal to or falls below the lower limit of conditional expression (7), lateral chromatic aberration in the wide-angle end state becomes large, so that it is undesirable. On the other hand, when the value ν21 is equal to or exceeds the upper limit of conditional expression (7), curvature of field in the intermediate focal length state becomes large, so that it is undesirable. In order to secure the effect of the present embodiment, it is preferable to set the lower limit of conditional expression (7) to 35. In order to secure the effect of the present embodiment, it is preferable to set the upper limit of conditional expression (7) to 42.

In a high-zoom-ratio zoom lens according to the present embodiment, in order to shorten the total lens length upon retracting the lens barrel in spite of a high-zoom-ratio optical system, the first lens group is preferably moved toward the object upon zooming from the wide-angle end state to the telephoto end state. With this configuration, it does not become necessary to secure the space to move the first lens group toward the image side that is necessary when the first lens group is fixed. Accordingly, it becomes possible to dispose the position of the most object side lens surface of the first lens group upon retracting the lens barrel closer to the image side than the position thereof in the wide-angle end state, so that the total lens length upon retracting the lens barrel can be shorten. Moreover, in order to carry out effective zooming, it is preferable that upon zooming from the wide-angle end state to the telephoto end state, the second lens group is moved along a zoom trajectory having a concave shape facing the object and the third lens group is moved toward the object. With this configuration, it becomes possible to reduce the space necessary for the second lens group to move upon zooming. In addition, it becomes possible to secure the space for the third lens group to move toward the object side upon zooming. Furthermore, it is desirable that the fourth lens group is moved along a zoom trajectory having a convex shape facing the object upon zooming. With this configuration, it becomes possible to correct variation in the image plane. Since all lens groups are moved upon zooming, refractive power of each lens group can be small, so that the radius of curvature of each lens group can be large. Accordingly, it becomes possible to suppress generation of high-order spherical aberration of the whole lens system of a high-zoom-ratio zoom lens.

In a high-zoom-ratio zoom lens according to the present embodiment, all lenses in the third lens group are preferably disposed with an air space in between. With this configuration, spherical aberration can be corrected well.

In a high-zoom-ratio zoom lens according to the present embodiment, the object side lens surface of the first positive lens in the third lens group is preferably an aspherical surface. With this configuration, spherical aberration can be corrected very well.

In a high-zoom-ratio zoom lens according to the present embodiment, all lenses in the second lens group are preferably disposed with an air space in between. With this configuration, curvature of field can be corrected well.

In a high-zoom-ratio zoom lens according to the present embodiment, the image side surface of the first negative lens in the second lens group is preferably an aspherical surface. With this configuration, curvature of field can be corrected very well.

In a high-zoom-ratio zoom lens according to the present embodiment, the fourth lens group is preferably moved along the optical axis upon focusing on infinity to a close-range object. With this configuration, a focusing mechanism can be put together on the camera body side.

In a high-zoom-ratio zoom lens according to the present embodiment, it is preferable that the image on the image plane can be shifted by moving the third lens group in a direction substantially perpendicular to the optical axis. With this configuration, the drive mechanism can be independent from the focusing mechanism, and an outer diameter of the optical system can be smaller. The similar effect can be obtained by moving a portion of the third lens group in a direction substantially perpendicular to the optical axis. In order to prevent a shooting error due to an image blur caused by a camera shake liable to happen in a high-zoom-ratio zoom lens, a high-zoom-ratio zoom lens according to the present embodiment with this configuration makes it possible to correct an image blur by means of combining a detector for detecting a camera shake and a driver to the lens system. Specifically, a lens group or a portion of a lens group composing the lens system is shifted as a shift lens group being driven by the driver so as to correct an image blur (variation in the image position) caused by a camera shake that is detected by the detector.

Each example of a high-zoom-ratio zoom lens according to the present embodiment is explained below with reference to accompanying drawings.

EXAMPLE 1

Figure 3:
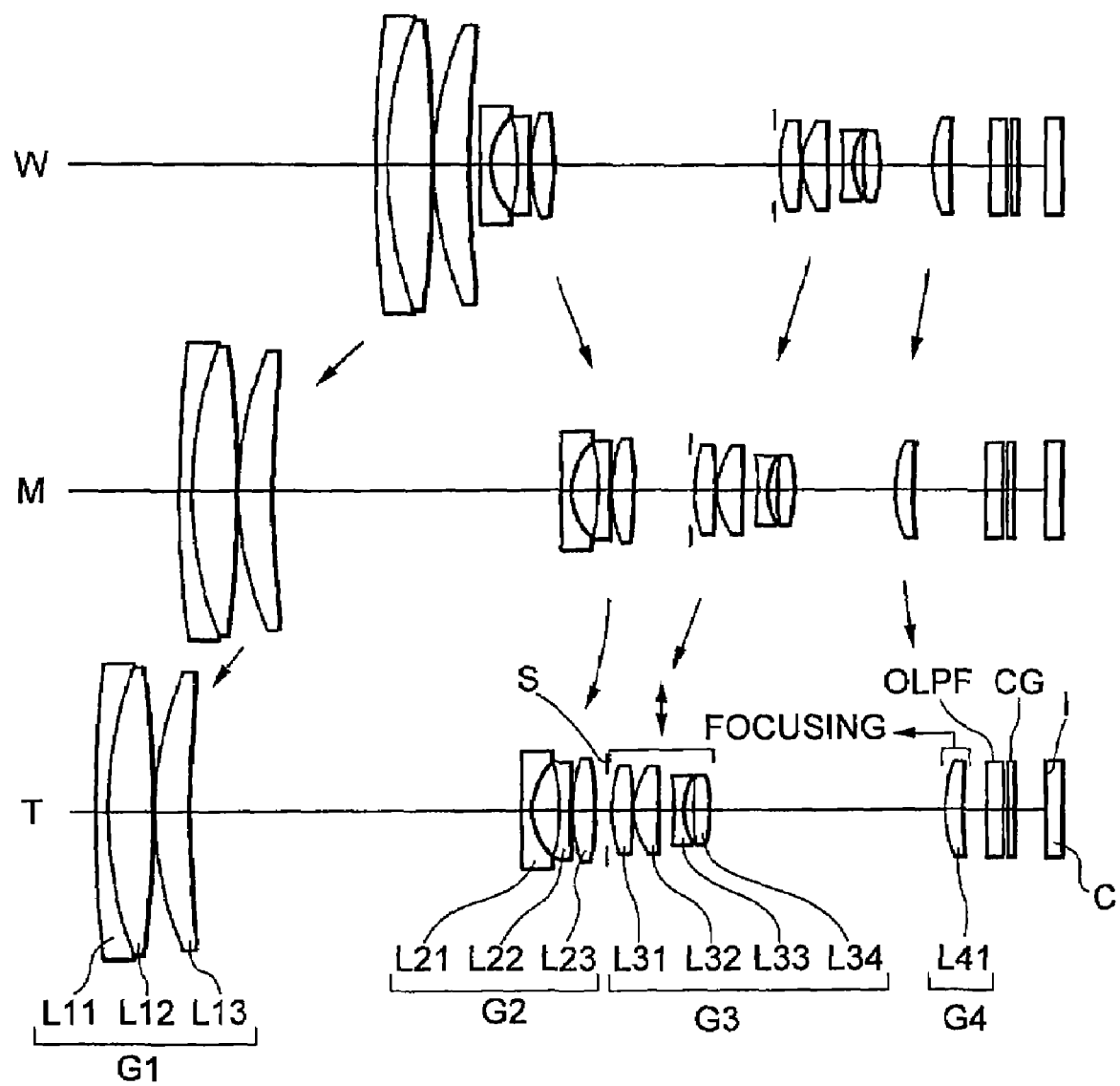
FIG. 3 is a diagram showing a lens configuration of a high-zoom-ratio zoom lens according to Example 1, in which W denotes a wide-angle end state, M denotes an intermediate focal length state, and T denotes a telephoto end state.

FIG. 3 is a diagram showing a lens configuration of a high-zoom-ratio zoom lens according to Example 1, in which W denotes a wide-angle end state, M denotes an intermediate focal length state, and T denotes a telephoto end state. Reference symbols are attached only to a diagram showing the telephoto end state.

In FIG. 3, the high-zoom-ratio zoom lens according to Example 1 is composed of, in order from an object, a first lens group G1 having positive refractive power, a second lens group G2 having negative refractive power, an aperture stop S, a third lens group G3 having positive refractive power, and a fourth lens group G4 having positive refractive power. Upon zooming from a wide-angle end state W to a telephoto end state T, the first lens group G1 is moved toward the object side, the second lens group G2 is moved along a trajectory having a concave shape facing the object, the third lens group G3 is moved toward the object side, and the fourth lens group is moved along a trajectory having a convex shape facing the object.

The first lens group G1 is composed of, in order from the object, a cemented lens constructed by a negative meniscus lens L11 having a convex surface facing the object cemented with a double convex positive lens L12, and a positive meniscus lens L13 having a convex surface facing the object.

The second lens group G2 is composed of, in order from the object, a double concave negative lens L21 having absolute value of a radius of curvature of the image side surface smaller than that of the object side surface, a double concave negative lens L22, and a double convex positive lens L23. The image side surface of the negative lens L21 is an aspherical surface.

The third lens group G3 is composed of, in order from the object, a double convex positive lens L31, a positive meniscus lens L32 having a convex surface facing the object, a double concave negative lens L33 having an absolute value of a radius of curvature of the image side surface smaller than that of the object side surface, and a double convex positive lens L34. The object side surface of the positive lens L31 is an aspherical surface.

The fourth lens group G4 is composed of a positive meniscus lens L41 having a convex surface facing the object.

Between the fourth lens group G4 and the image plane I, there are provided an optical low-pass filter OLPF and a cover glass CG for a solid-state imaging device C.

An aperture stop S is disposed in the vicinity of the most object side lens in the third lens group, and moved together with the third lens group G3 upon zooming from the wide-angle end state W to the telephoto end state T.

Focusing from infinity to a close-range object is carried out by moving the fourth lens group G4 along the optical axis.

The image can be shifted on the image plane I by moving the third lens group G3 in a direction perpendicular to the optical axis.

The solid-state imaging device C disposed on the image plane I has a diagonal length IH, which is a length from the center to a corner, of 3.75 mm.

Various values associated with the high-zoom-ratio zoom lens according to Example 1 are listed in Table 1.

In [Specifications], F denotes a focal length, and FNO denotes an f-number.

In [Lens Data], the first column shows the lens surface number counted in order from the object side, the second column "r" shows a radius of curvature of the lens surface, the third column "d" shows a distance to the next lens surface along the optical axis, the fourth column "vd" shows Abbe number of the medium at d-line (wavelength $\lambda$=587.6 nm), and the fifth column "nd" shows refractive index of the medium at d-line (wavelength $\lambda$=587.6 nm). "Bf" denotes a back focal length, and refractive index of the air nd=1.000000 is omitted. In the second column "r", "r=∞" denotes a plane surface or an aperture stop.

In [Aspherical Data], an aspherical surface is exhibited by the following expression:

$$S(y)=(y^2/R)/[1+[1-\kappa(y^2/R^2)]^{1/2}]+C4\times y^4+C6\times y^6+C8\times y^8$$

where y denotes a vertical height from the optical axis, S(y) denotes a sag amount which is a distance along the optical axis from the tangent surface at the vertex of the aspherical surface to the aspherical surface at the vertical height y from the optical axis, R denotes a radius of curvature of a reference sphere (paraxial radius of curvature), $\kappa$ denotes a conical coefficient, and Cn denotes aspherical coefficient of n-th order. In [Aspherical Data], "E-n" denotes "×10$^{-n}$"

In [Variable Distances], focal length F, imaging magnification $\beta$, distance between the object and the most object side lens surface D0, values for respective variable distances with respect to wide-angle end state W, intermediate focal length state M, and telephoto end stat T upon focusing on infinity and a close-range object are shown.

In [Values for Conditional Expressions], values for respective conditional expressions are shown.

In the tables for various values, unless otherwise specified, "mm" is generally used for the unit of length such as the focal length, the radius of curvature and the distance to the next lens surface. However, since similar optical performance can be obtained by an optical system proportionally enlarged or reduced its dimension, the unit is not necessarily to be limited to "mm", and any other suitable unit can be used.

The explanation of reference symbols is the same in the other Examples, so that duplicated explanations are omitted.

TABLE 1

[Specifications]

| | W | T |
|---|---|---|
| F = | 6.45 | 73.00 |
| FNO = | 2.8 | 4.7 |

[Lens Data]

| | r | d | vd | nd |
|---|---|---|---|---|
| 1) | 136.9448 | 1.3000 | 31.31 | 1.903660 |
| 2) | 42.1550 | 4.3000 | 82.56 | 1.497820 |
| 3) | −97.0325 | 0.1000 | | |
| 4) | 34.4091 | 3.4000 | 52.30 | 1.74809 |
| 5) | 150.4259 | D5 | | |
| 6) | −171.0778 | 1.0000 | 40.19 | 1.850490 |
| 7) | 6.4551 | 2.7000 | | |
| 8) | −16.1874 | 1.0000 | 46.63 | 1.816000 |
| 9) | 89.2268 | 0.2000 | | |
| 10) | 18.8489 | 2.0000 | 23.82 | 1.846660 |
| 11) | −30.5859 | D11 | | |
| 12> | ∞ | 0.5000 | Aperture Stop S | |
| 13) | 14.6189 | 2.0000 | 59.56 | 1.583130 |
| 14) | −54.6567 | 0.1000 | | |
| 15) | 6.8556 | 2.4000 | 82.56 | 1.497820 |
| 16) | 178.8279 | 1.5000 | | |
| 17) | −42.7757 | 1.0000 | 31.31 | 1.903660 |
| 18) | 6.8594 | 1.0000 | | |
| 19) | 61.7010 | 1.5000 | 59.38 | 1.583130 |
| 20) | −11.8214 | D20 | | |
| 21) | 12.7868 | 1.7000 | 82.56 | 1.497820 |
| 22) | 54.3290 | D22 | | |
| 23) | ∞ | 1.6500 | 64.14 | 1.516330 |
| 24) | ∞ | 0.4000 | | |
| 25) | ∞ | 0.5000 | 64.14 | 1.516330 |
| 26) | ∞ | Bf | | |

TABLE 1-continued

[Aspherical Data]

Surface Number: 7

κ = 0.7305
C4 = 0.00000E+00
C6 = 2.63710E-07
C8 = -2.76800E-08

Surface Number: 13

κ = -0.4844
C4 = 0.00000E+00
C6 = 2.01230E-07
C8 = 0.00000E+00

[Variable Distances]

| | W | M | T |
|---|---|---|---|
| (Focusing on infinity) | | | |
| F | 6.45456 | 35.00000 | 73.00000 |
| D0 | ∞ | ∞ | ∞ |
| D5 | 1.23770 | 27.99786 | 32.49665 |
| D11 | 21.35445 | 5.37780 | 0.67747 |
| D20 | 4.86402 | 9.52979 | 22.67821 |
| D22 | 4.00252 | 7.21263 | 2.29346 |
| Bf | 2.86500 | 2.86500 | 2.86500 |
| (Focusing on a close-range object) | | | |
| β | -0.10000 | -0.10000 | -0.10000 |
| D0 | 48.8522 | 244.7221 | 503.0452 |
| D5 | 1.23770 | 27.99786 | 32.49665 |
| D11 | 21.35445 | 5.37780 | 0.67747 |
| D20 | 3.67904 | 4.74109 | 12.02343 |
| D22 | 5.18750 | 12.00133 | 12.94824 |
| Bf | 2.86500 | 2.86500 | 2.86500 |

[moving amount of G3 and tha of the image upon VR]

| | W | M | T |
|---|---|---|---|
| (focusing on infinity) | | | |
| F | 6.45456 | 35.00000 | 73.00000 |
| G3 | ±0.097 | ±0.183 | ±0.201 |
| image | ±0.117 | ±0.273 | ±0.395 |
| (focusing on a close-range object) | | | |
| β | -0.10000 | -0.10000 | -0.10000 |
| G3 | ±0.097 | ±0.183 | ±0.201 |
| image | ±0.117 | ±0.273 | ±0.395 |

[Values for Conditional Expressions]

(1): N33 = 1.904
(2): ν33 = 31.3
(3): Ra/Rb = -0.267
(4): Rc/Rd = 0.038
(5): Re/Rf = -0.181
(6): N21 = 1.850
(7): ν21 = 40.2

Figure 4A:
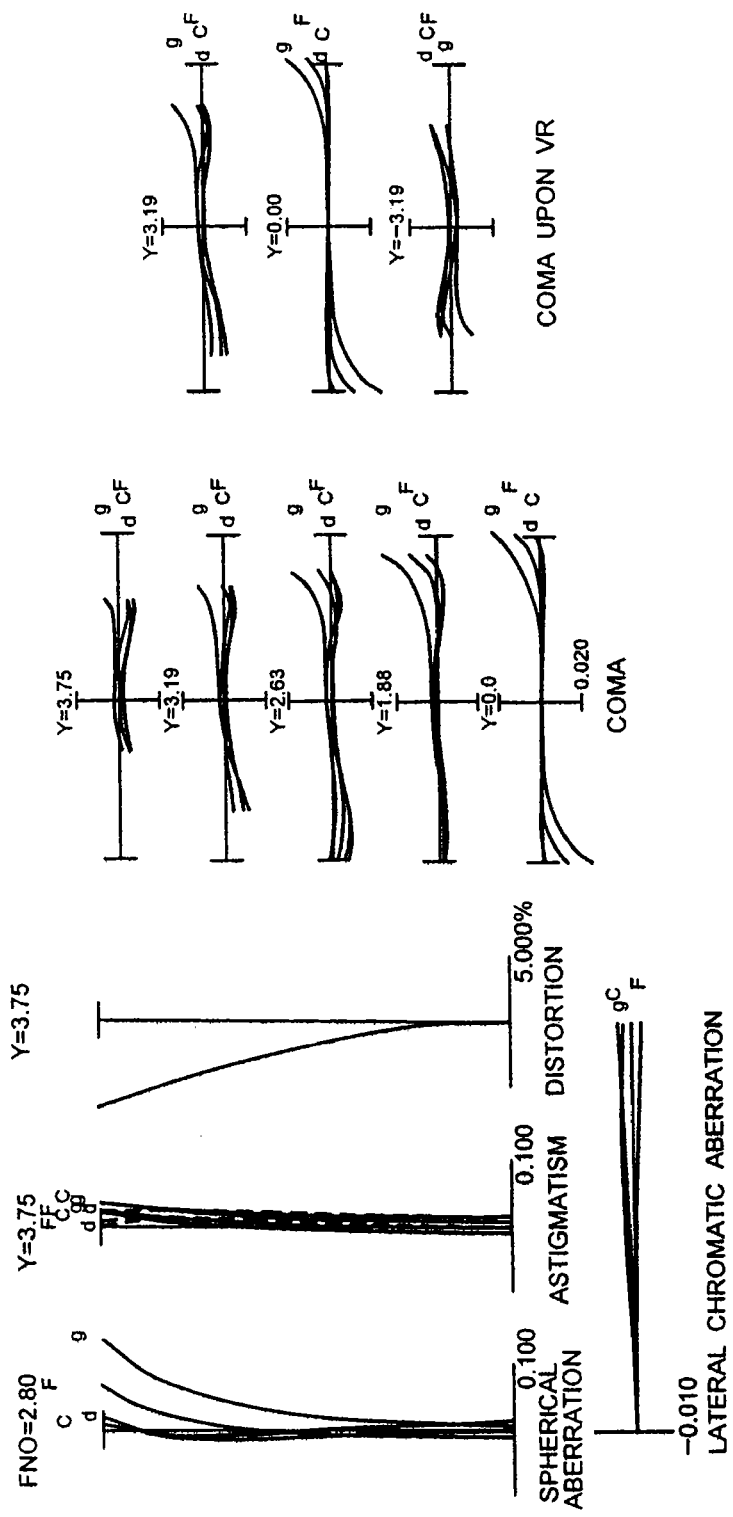
Figure 4B:
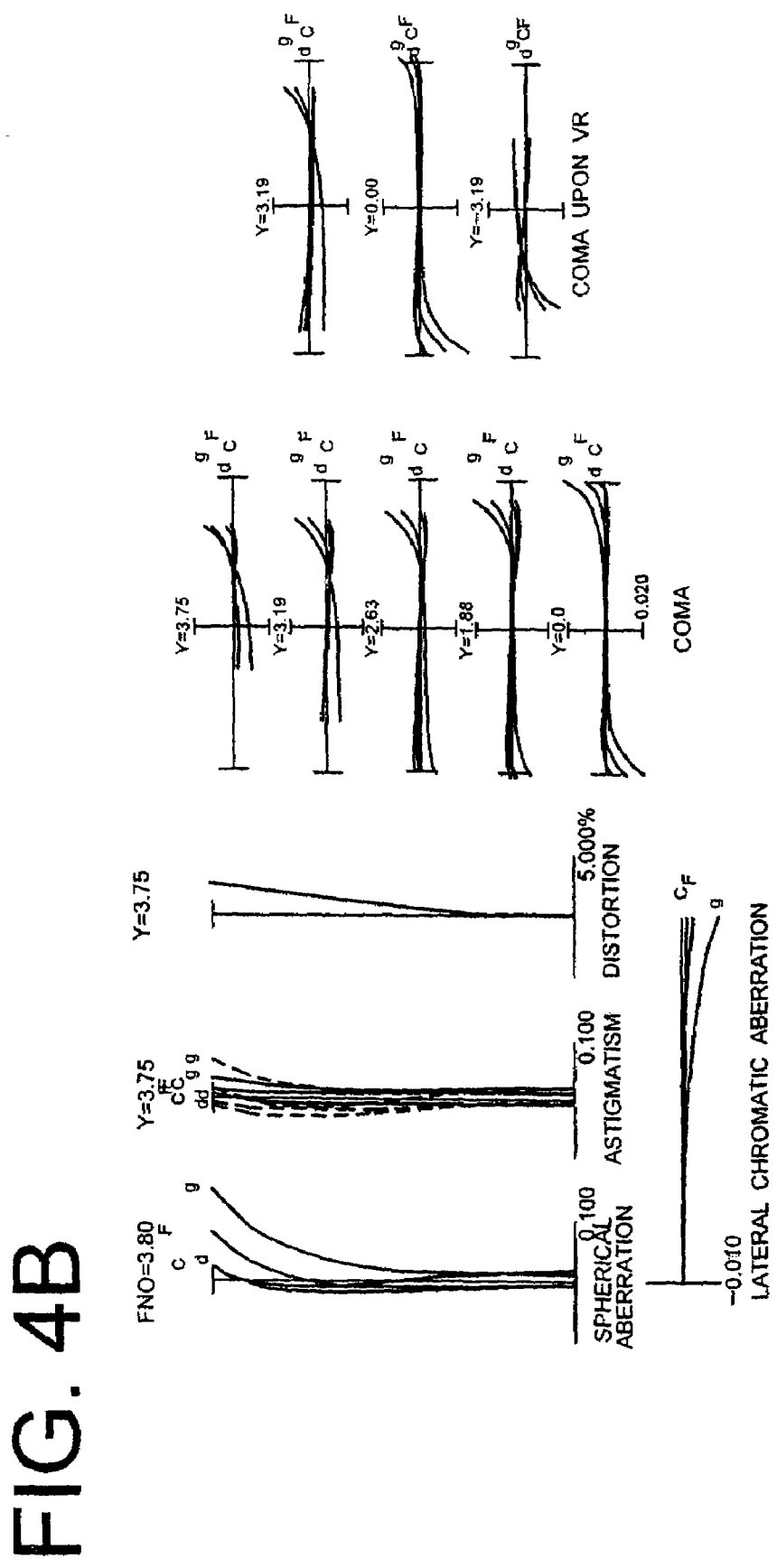
Figure 4C:
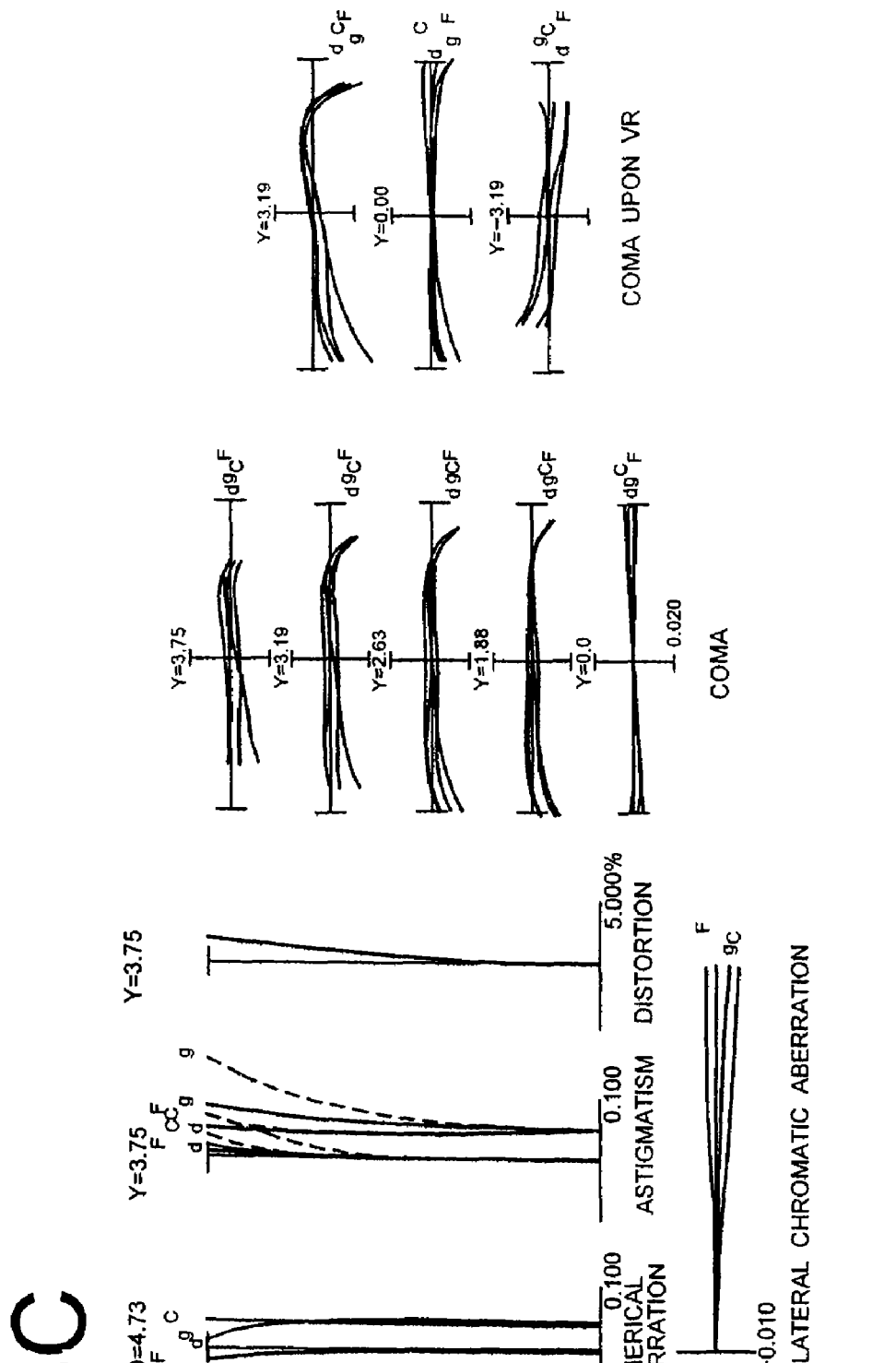
Figure 5A:
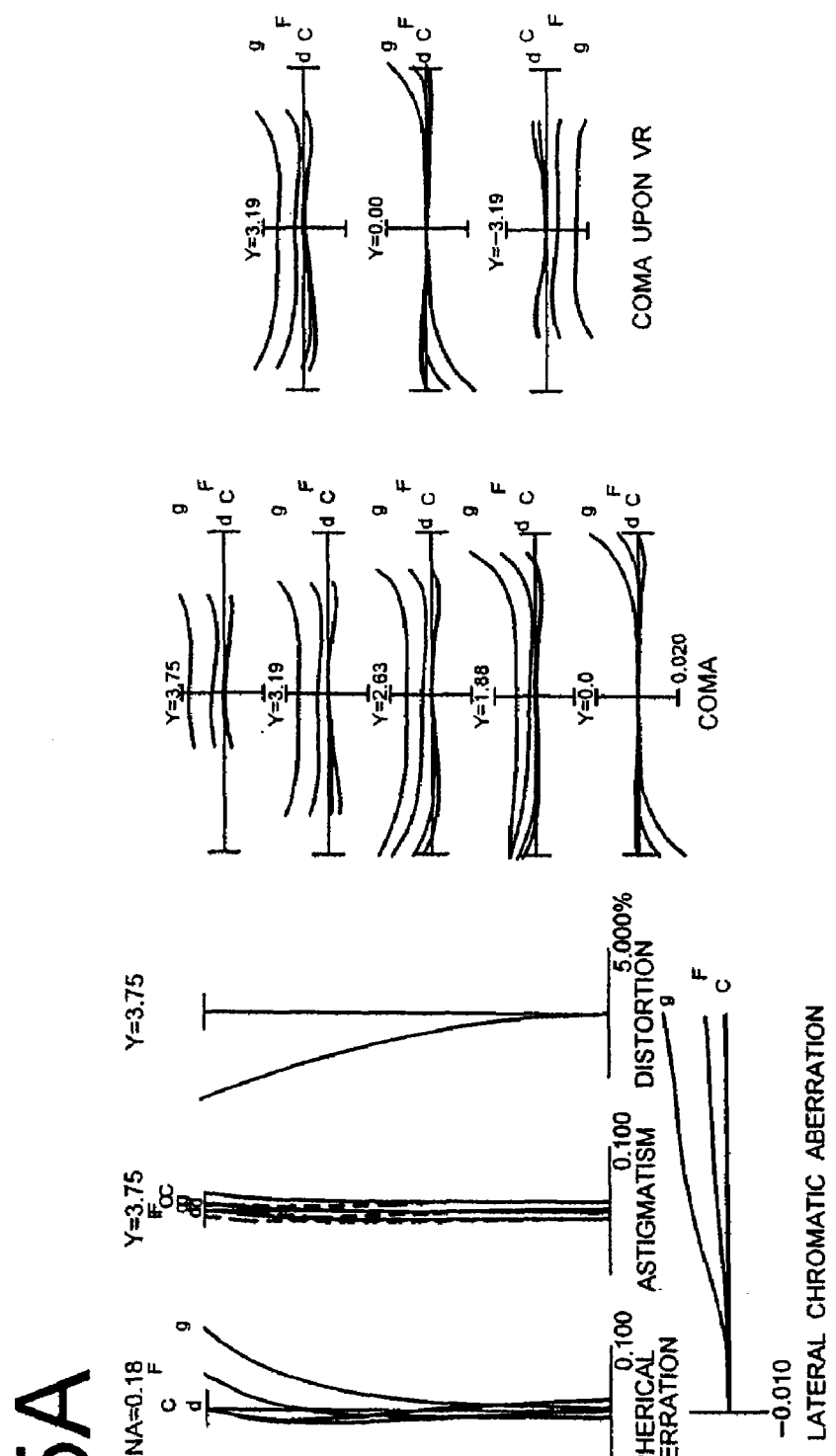
Figure 5B:
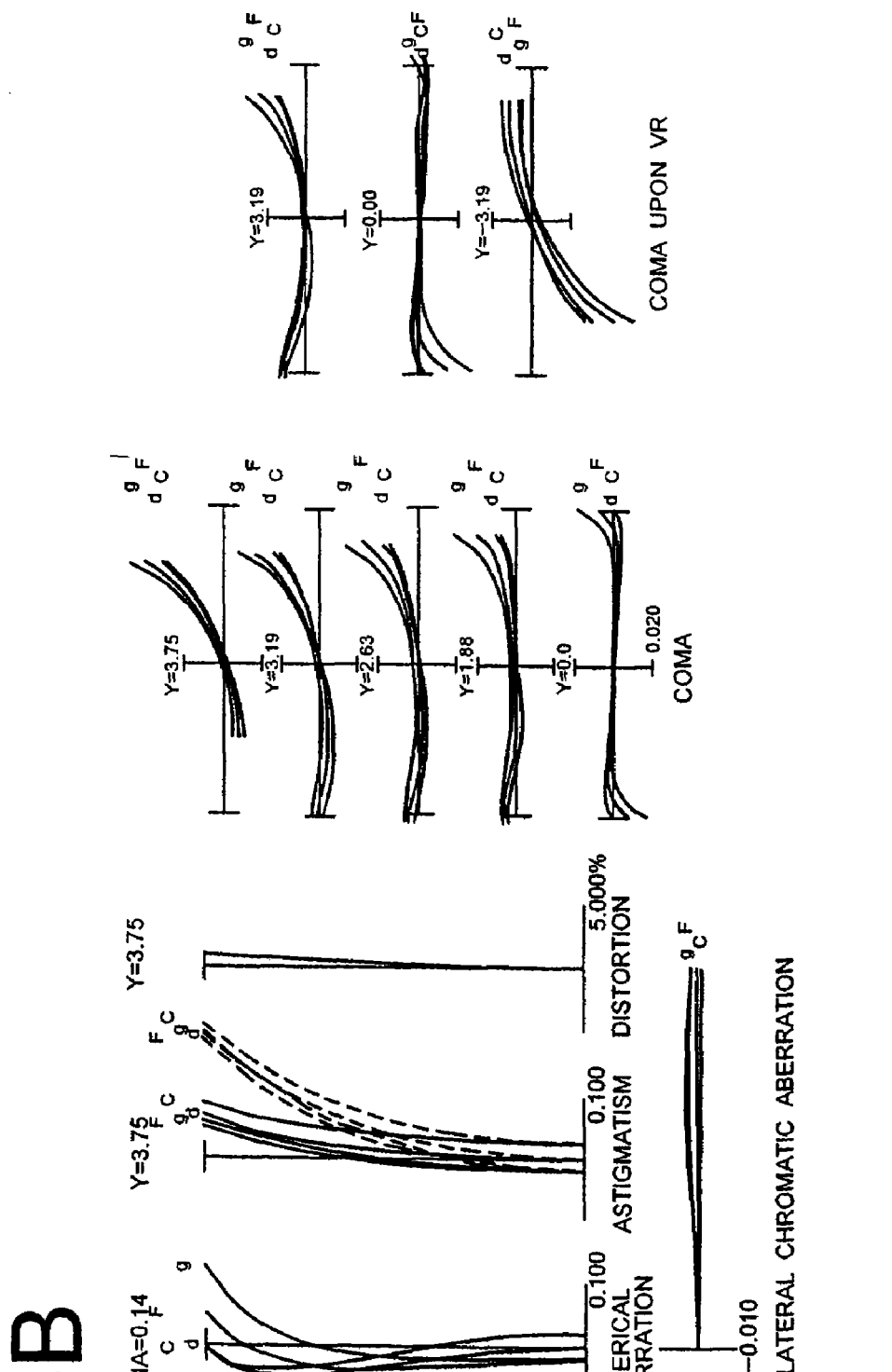
Figure 5C:
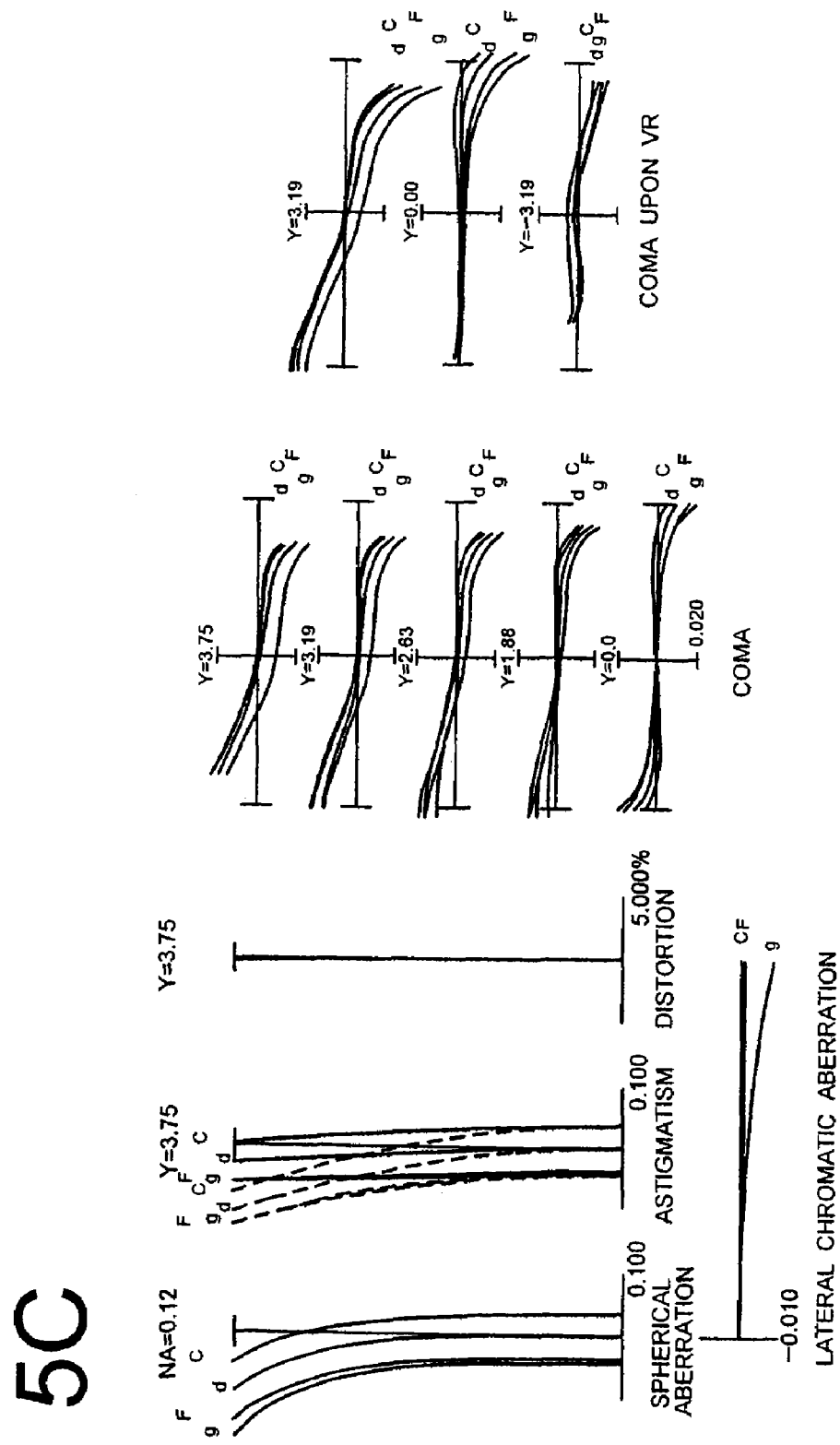

FIGS. 4A, 4B and 4C are graphs showing various aberrations of the high-zoom-ratio zoom lens according to Example 1 upon focusing on infinity and lateral aberration upon vibration reduction, in which FIG. 4A shows in a wide-angle end state, FIG. 4B shows in an intermediate focal length state, and FIG. 4C shows in a telephoto end state. FIGS. 5A, 5B and 5C are graphs showing various aberrations of the high-zoom-ratio zoom lens according to Example 1 upon focusing on close-range object and lateral aberration upon vibration reduction, in which FIG. 5A shows in a wide-angle end state where the distance between the object and the image plane Rw=113 mm, FIG. 5B shows in an intermediate focal length state where the distance between the object and the image plane Rm=328 mm, and FIG. 4C shows in a telephoto end state where the distance between the object and the image plane Rt=594 mm.

In respective graphs, Y denotes an image height, NA denotes a numerical aperture, D denotes aberration curve at d-line (wavelength λ=587.6 nm), G denotes aberration curve at g-line (wavelength λ=435.6 nm), C denotes aberration curve at C-line (wavelength λ=656.3 nm), and F denotes aberration curve at F-line (wavelength λ=486.1 nm). In the graph showing astigmatism, a solid line indicates a sagittal image plane, and a broken line indicates a meridional image plane. In the graph showing lateral chromatic aberration, each aberration curve is shown using d-line as a reference. The above-described explanation regarding various aberration graphs is the same as the other examples.

As is apparent from the respective graphs, the high-zoom-ratio zoom lens according to Example 1 shows superb optical performance as a result of good corrections to various aberrations over entire zooming range from the wide-angle end state W to the telephoto end state T.

EXAMPLE 2

Figure 6:
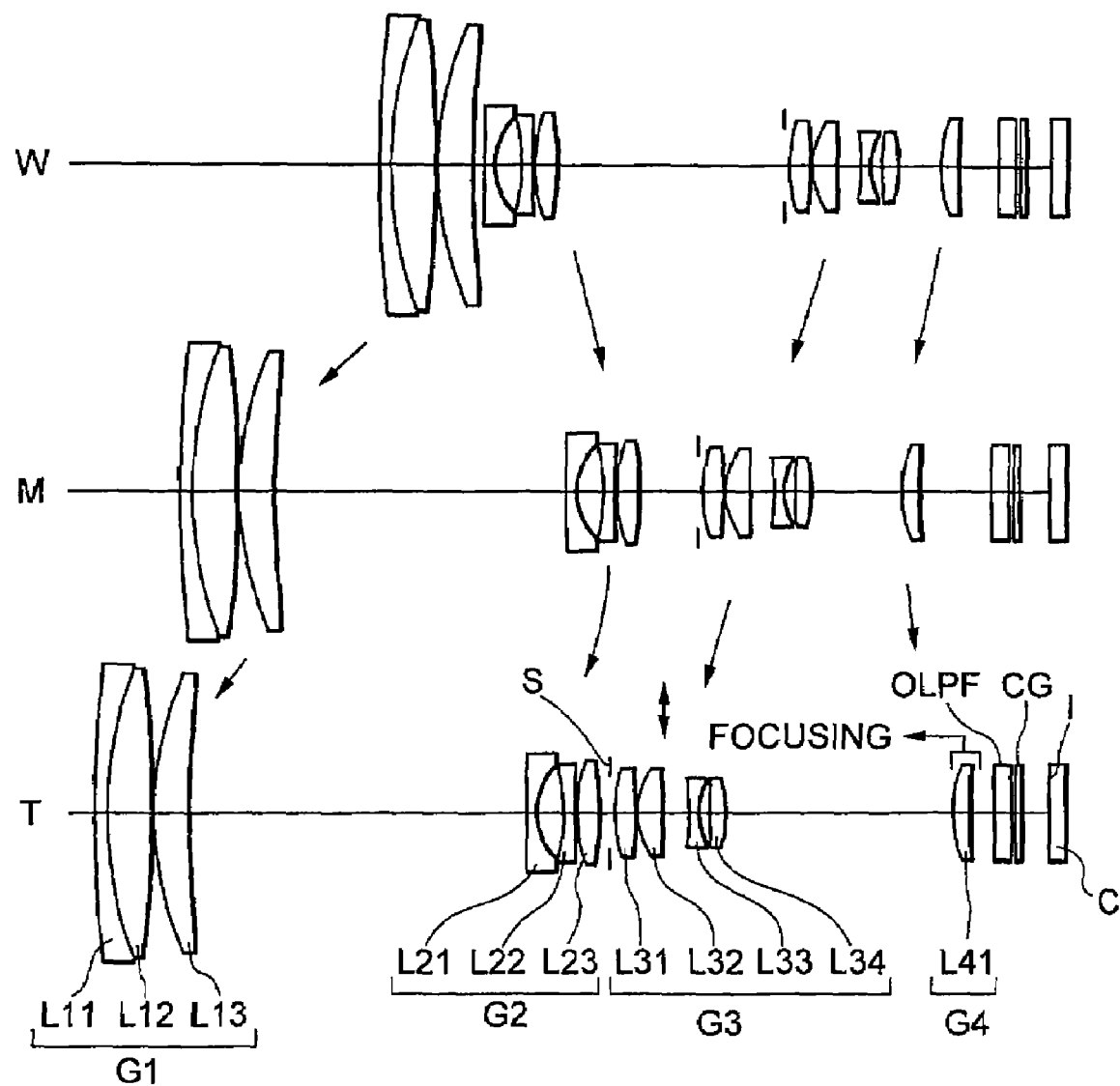
FIG. 6 is a diagram showing a lens configuration of a high-zoom-ratio zoom lens according to Example 2, in which W denotes a wide-angle end state, M denotes an intermediate focal length state, and T denotes a telephoto end state.

FIG. 6 is a diagram showing a lens configuration of a high-zoom-ratio zoom lens according to Example 2, in which W denotes a wide-angle end state, M denotes an intermediate focal length state, and T denotes a telephoto end state. Reference symbols are attached only to a diagram showing the telephoto end state.

In FIG. 6, the high-zoom-ratio zoom lens according to Example 2 is composed of, in order from an object, a first lens group G1 having positive refractive power, a second lens group G2 having negative refractive power, an aperture stop S, a third lens group G3 having positive refractive power, and a fourth lens group G4 having positive refractive power. Upon zooming from a wide-angle end state W to a telephoto end state T, the first lens group G1 is moved toward the object side, the second lens group G2 is moved along a trajectory having a concave shape facing the object, the third lens group G3 is moved toward the object side, and the fourth lens group is moved along a trajectory having a convex shape facing the object.

The first lens group G1 is composed of, in order from the object, a cemented lens constructed by a negative meniscus lens L11 having a convex surface facing the object cemented with a double convex positive lens L12, and a positive meniscus lens L13 having a convex surface facing the object.

The second lens group G2 is composed of, in order from the object, a double concave negative lens L21 having absolute value of a radius of curvature of the image side surface smaller than that of the object side surface, a double concave negative lens L22, and a double convex positive lens L23. The image side surface of the negative lens L21 is an aspherical surface.

The third lens group G3 is composed of, in order from the object, a positive meniscus lens L31 having a convex surface facing the object, a positive meniscus lens L32 having a convex surface facing the object, a double concave negative lens L33 having an absolute value of a radius of curvature of the image side surface smaller than that of the object side surface, and a double convex positive lens L34. The object side surface of the positive lens L31 is an aspherical surface.

The fourth lens group G4 is composed of a positive meniscus lens L41 having a convex surface facing the object.

Between the fourth lens group G4 and the image plane I, there are provided an optical low-pass filter OLPF and a cover glass CG for a solid-state imaging device C.

An aperture stop S is disposed in the vicinity of the most object side lens in the third lens group, and moved together with the third lens group G3 upon zooming from the wide-angle end state W to the telephoto end state T.

Focusing from infinity to a close-range object is carried out by moving the fourth lens group G4 along the optical axis.

The solid-state imaging device C disposed on the image plane I has a diagonal length IH, which is a length from the center to a corner, of 3.75 mm.

Various values associated with the high-zoom-ratio zoom lens according to Example 2 are listed in Table 2.

TABLE 2

[Specifications]

| | W | T |
|---|---|---|
| F = | 6.45 | 73.00 |
| FNO = | 2.8 | 4.7 |

[Lens Data]

| | r | d | vd | nd |
|---|---|---|---|---|
| 1) | 97.7573 | 1.3000 | 31.31 | 1.903660 |
| 2) | 36.7384 | 4.3000 | 82.56 | 1.497820 |
| 3) | −190.3772 | 0.1000 | | |
| 4) | 36.1073 | 3.4000 | 52.30 | 1.748099 |
| 5) | 306.2555 | D5 | | |
| 6) | −164.2270 | 1.0000 | 40.77 | 1.883000 |
| 7) | 6.5948 | 2.7000 | | |
| 8) | −17.7691 | 1.0000 | 46.63 | 1.816000 |
| 9) | 80.2761 | 0.2000 | | |
| 10) | 18.4709 | 2.0000 | 23.82 | 1.846660 |
| 11) | −32.9487 | D11 | | |
| 12> | ∞ | 0.5000 | Aperture Stop S | |
| 13) | 12.7903 | 2.0000 | 59.56 | 1.583130 |
| 14) | 287.5849 | 0.1000 | | |
| 15) | 7.9468 | 2.4000 | 82.56 | 1.497820 |
| 16) | −94.1409 | 2.3000 | | |
| 17) | −62.1235 | 1.0000 | 25.46 | 2.000690 |
| 18) | 7.2193 | 1.0000 | | |
| 19) | 24.9941 | 1.5000 | 32.35 | 1.850260 |
| 20) | −22.8323 | D20 | | |
| 21) | 12.8103 | 1.7000 | 82.56 | 1.497820 |
| 22) | 54.7803 | D22 | | |
| 23) | ∞ | 1.6500 | 64.14 | 1.516330 |
| 24) | ∞ | 0.4000 | | |
| 25) | ∞ | 0.5000 | 64.14 | 1.516330 |
| 26) | ∞ | Bf | | |

[Aspherical Data]

Surface Number: 7

$\kappa = 0.7324$
$C4 = 0.00000E+00$
$C6 = -9.02480E-07$
$C8 = -1.64640E-08$

Surface Number: 13

$\kappa = -0.3579$
$C4 = 0.00000E+00$
$C6 = -6.65900E-07$
$C8 = 0.00000E+00$

[Variable Distances]

| | W | M | T |
|---|---|---|---|

(Focusing on infinity)

| | | | |
|---|---|---|---|
| F | 6.45456 | 35.00000 | 73.00000 |
| D0 | ∞ | ∞ | ∞ |

TABLE 2-continued

| | | | |
|---|---|---|---|
| D5 | 1.23770 | 27.99786 | 32.49665 |
| D11 | 21.67697 | 5.70032 | 0.99999 |
| D20 | 4.18727 | 8.85304 | 22.00146 |
| D22 | 4.00252 | 7.21263 | 2.29346 |
| Bf | 2.89614 | 2.89614 | 2.89614 |

(Focusing on a close-rang object)

| | | | |
|---|---|---|---|
| β | −0.10000 | −0.10000 | −0.10000 |
| D0 | 48.8489 | 244.7188 | 503.0419 |
| D5 | 1.23770 | 27.99786 | 32.49665 |
| D11 | 21.67697 | 5.70032 | 0.99999 |
| D20 | 3.00229 | 4.06434 | 11.34668 |
| D22 | 5.18750 | 12.00133 | 12.94824 |
| Bf | 2.89614 | 2.89614 | 2.89614 |

[Values for Conditional Expressions]

(1): $N33 = 2.001$
(2): $\nu33 = 25.5$
(3): $Ra/Rb = 0.044$
(4): $Rc/Rd = -0.084$
(5): $Re/Rf = -0.221$
(6): $N21 = 1.883$
(7): $\nu21 = 40.8$

Figure 7A:
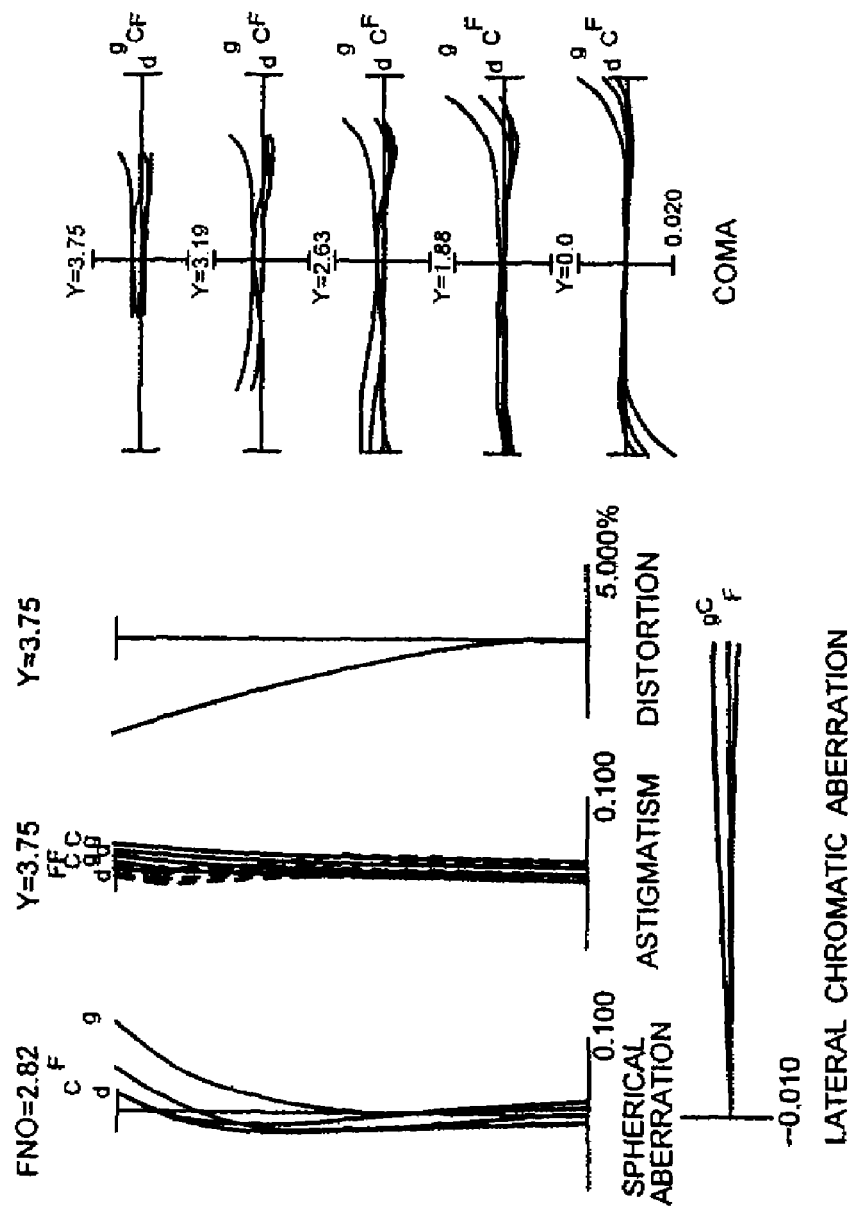
Figure 7B:
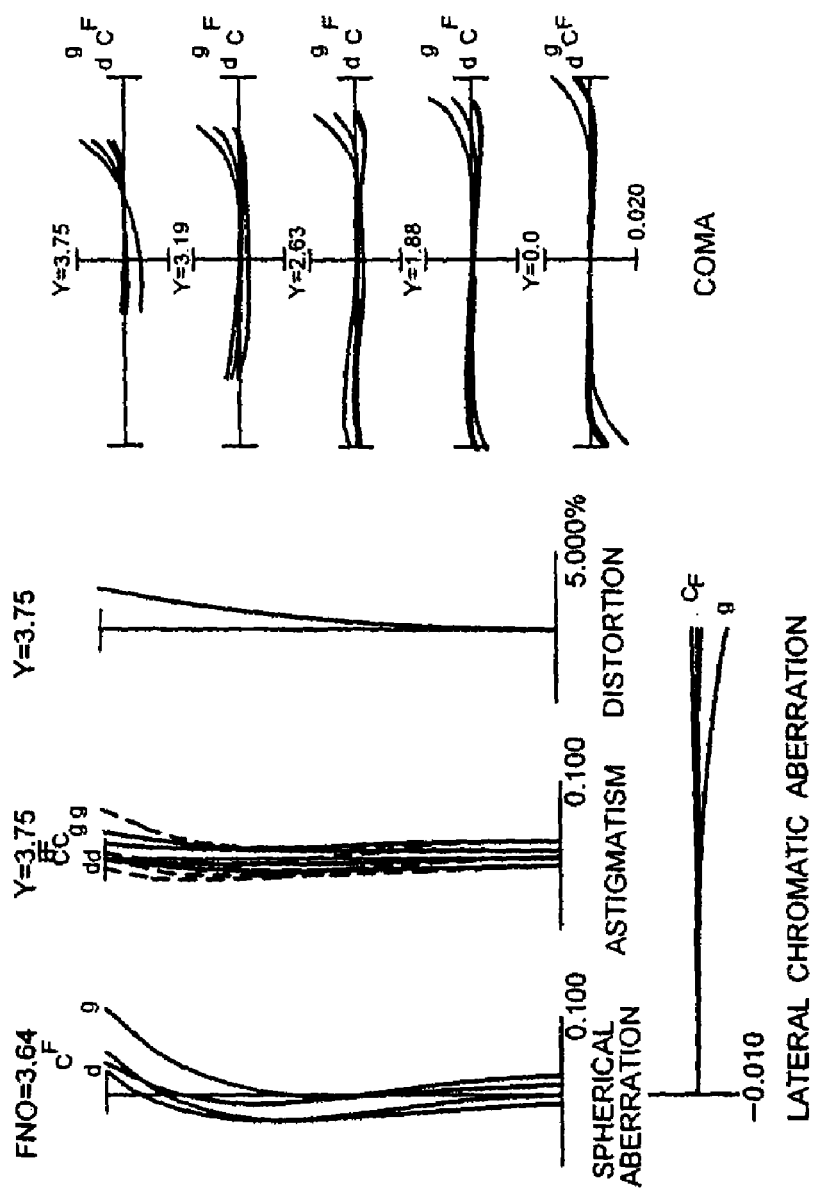
Figure 7C:
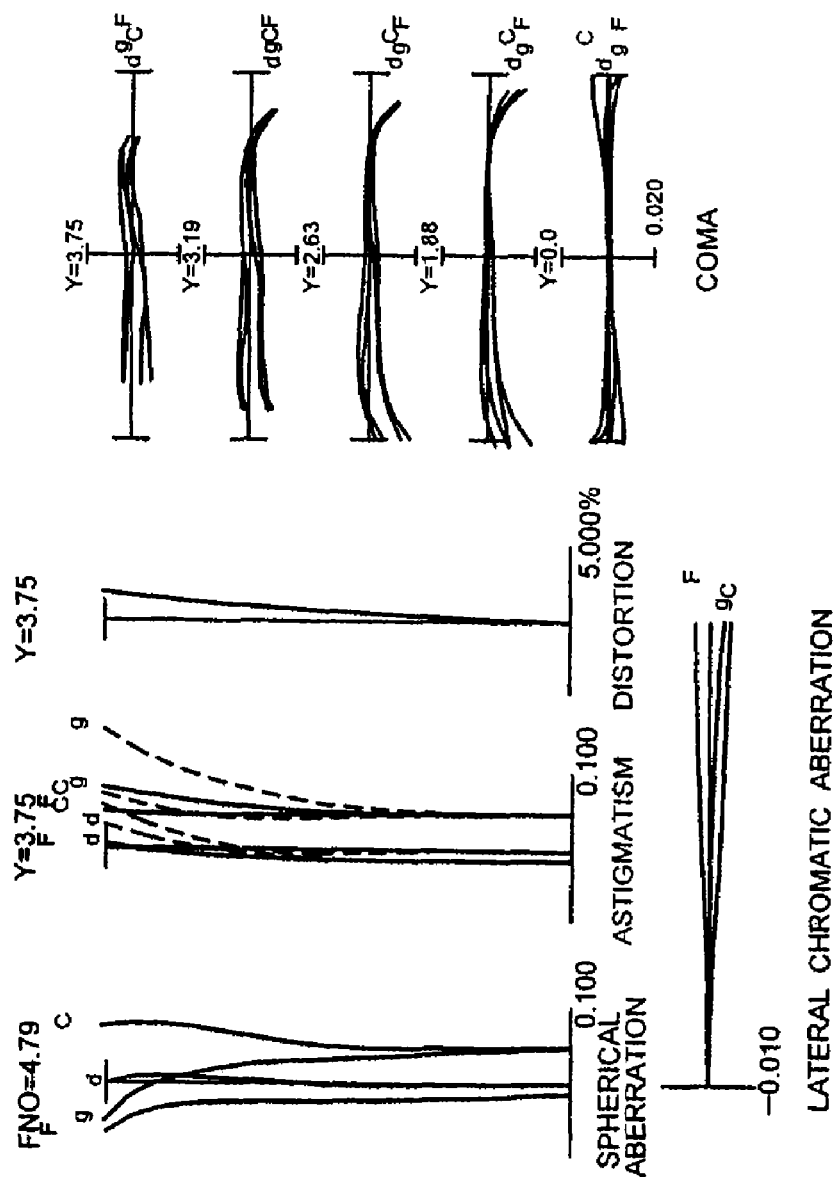
Figure 8A:
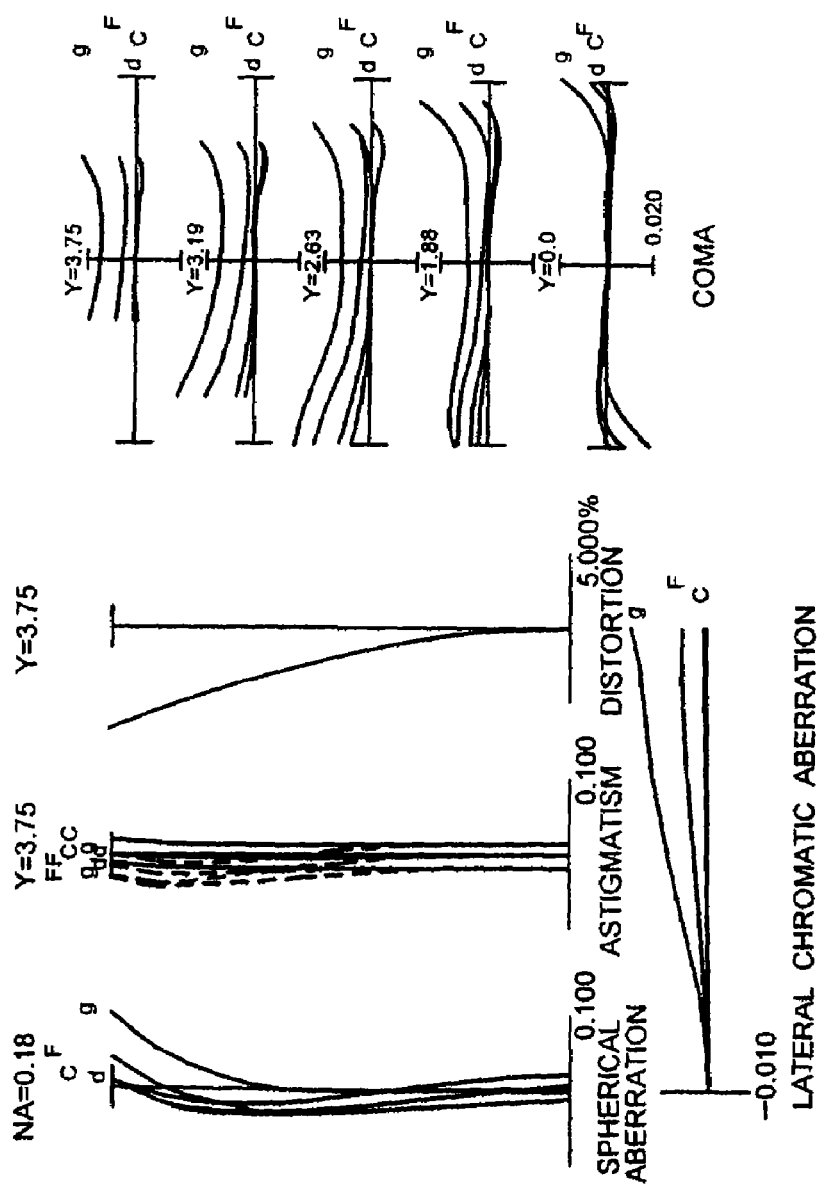
Figure 8B:
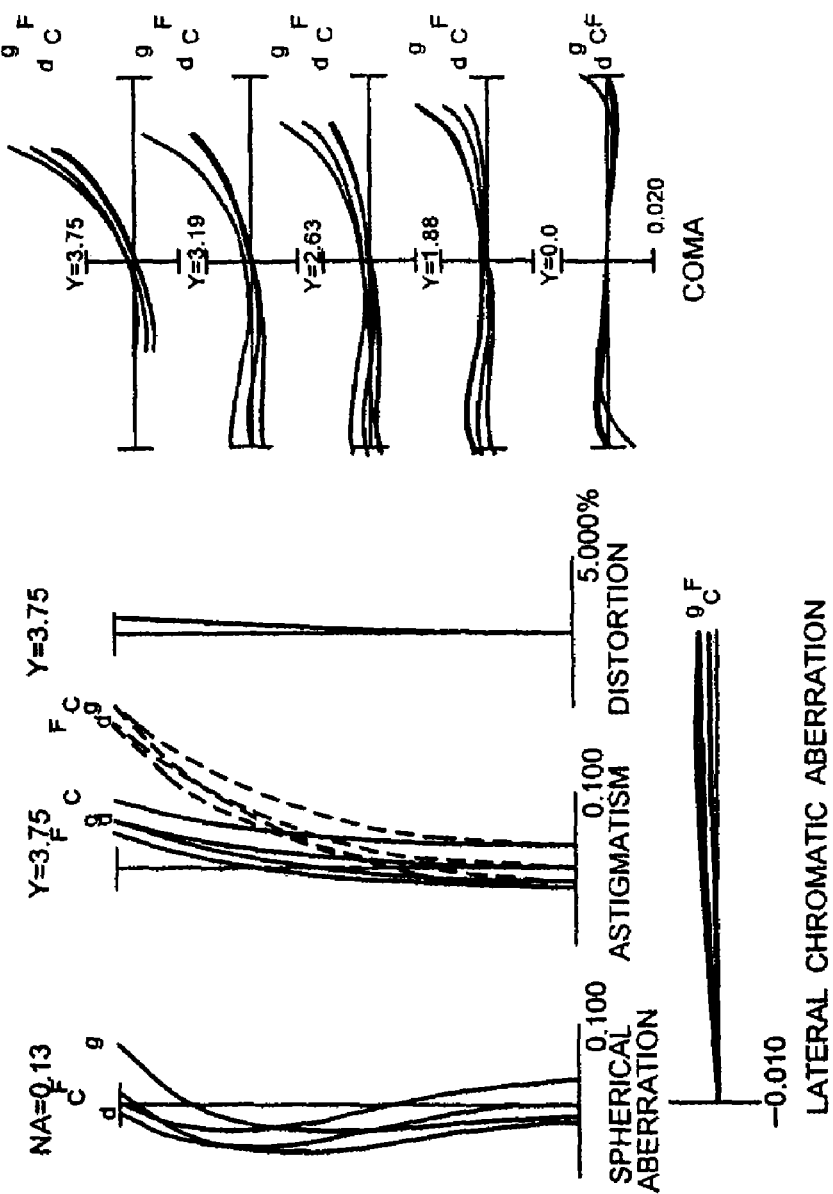
Figure 8C:
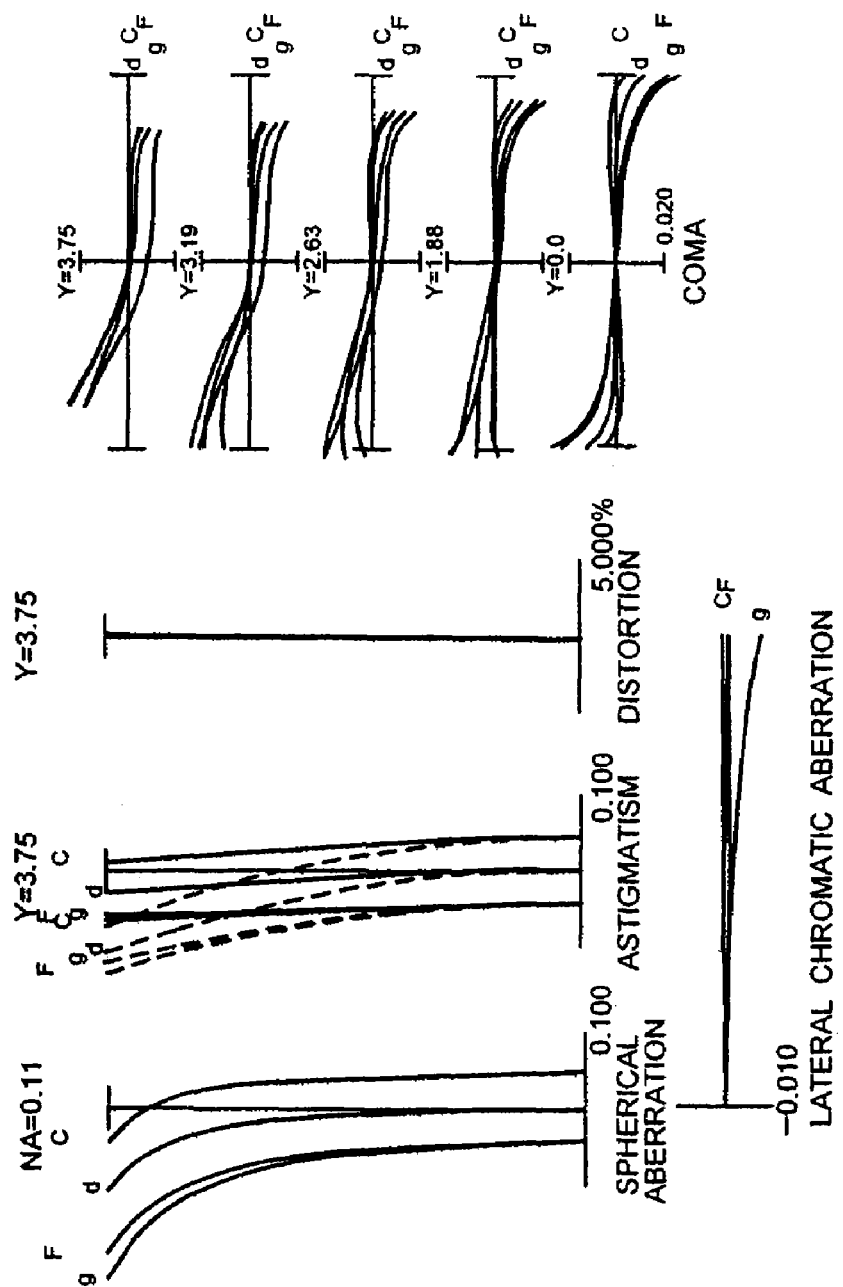

FIGS. 7A, 7B and 7C are graphs showing various aberrations of the high-zoom-ratio zoom lens according to Example 2 upon focusing on infinity, in which FIG. 7A shows in a wide-angle end state, FIG. 7B shows in an intermediate focal length state, and FIG. 7C shows in a telephoto end state. FIGS. 8A, 8B and 8C are graphs showing various aberrations of the high-zoom-ratio zoom lens according to Example 2 upon focusing on close-range object, in which FIG. 8A shows in a wide-angle end state where the distance between the object and the image plane Rw=114 mm, FIG. 8B shows in an intermediate focal length state where the distance between the object and the image plane Rm=328 mm, and FIG. 8C shows in a telephoto end state where the distance between the object and the image plane Rt=595 mm.

As is apparent from the respective graphs, the high-zoom-ratio zoom lens according to Example 2 shows superb optical performance as a result of good corrections to various aberrations over entire zooming range from the wide-angle end state W to the telephoto end state T.

EXAMPLE 3

Figure 9:
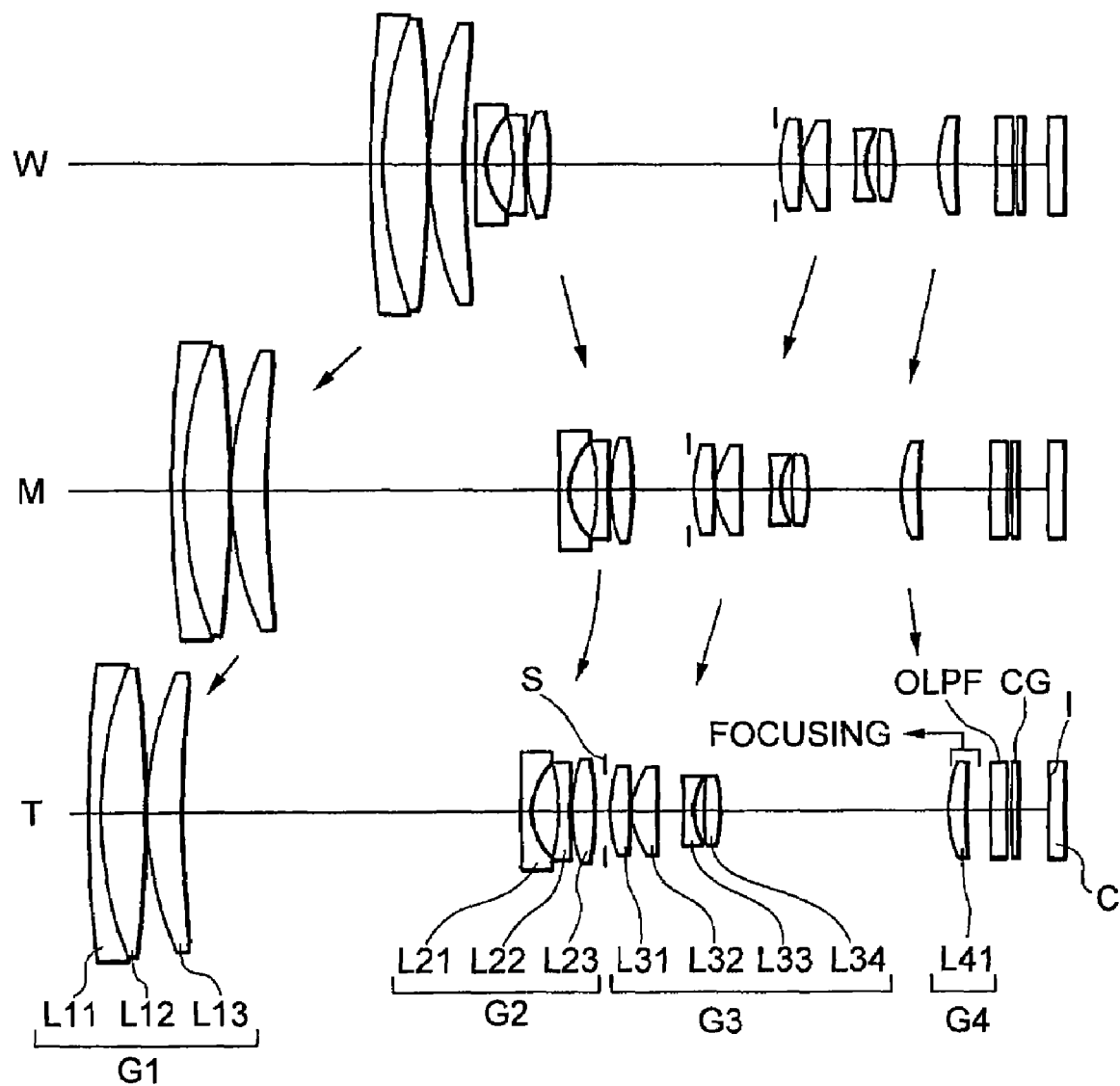
FIG. 9 is a diagram showing a lens configuration of a high-zoom-ratio zoom lens according to Example 3, in which W denotes a wide-angle end state, M denotes an intermediate focal length state, and T denotes a telephoto end state.

FIG. 9 is a diagram showing a lens configuration of a high-zoom-ratio zoom lens according to Example 3, in which w denotes a wide-angle end state, M denotes an intermediate focal length state, and T denotes a telephoto end state. Reference symbols are attached only to a diagram showing the telephoto end state.

In FIG. 9, the high-zoom-ratio zoom lens according to Example 3 is composed of, in order from an object, a first lens group G1 having positive refractive power, a second lens group G2 having negative refractive power, an aperture stop S, a third lens group G3 having positive refractive power, and a fourth lens group G4 having positive refractive power. Upon zooming from a wide-angle end state W to a telephoto end state T, the first lens group G1 is moved toward the object side, the second lens group G2 is moved along a trajectory having a concave shape facing the object, the third lens group G3 is moved toward the object side, and the fourth lens group is moved along a trajectory having a convex shape facing the object.

The first lens group G1 is composed of, in order from the object, a cemented lens constructed by a negative meniscus lens L11 having a convex surface facing the object cemented with a double convex positive lens L12, and a positive meniscus lens L13 having a convex surface facing the object.

The second lens group G2 is composed of, in order from the object, a double concave negative lens L21 having an absolute value of a radius of curvature of the image side surface smaller than that of the object side surface, a negative meniscus lens L22 having a concave surface facing the object, and a double convex positive lens L23. The image side surface of the negative lens L21 is an aspherical surface.

The third lens group G3 is composed of, in order from the object, a double convex positive lens L31, a double convex positive lens L32, a double concave negative lens L33 having an absolute value of a radius of curvature of the image side surface smaller than that of the object side surface, and a double convex positive lens L34. The object side surface of the positive lens L31 is an aspherical surface.

The fourth lens group G4 is composed of a positive meniscus lens L41 having a convex surface facing the object.

Between the fourth lens group G4 and the image plane I, there are provided an optical low-pass filter OLPF and a cover glass CG for a solid-state imaging device C.

An aperture stop S is disposed in the vicinity of the most object side lens in the third lens group, and moved together with the third lens group G3 upon zooming from the wide-angle end state W to the telephoto end state T.

Focusing from infinity to a close-range object is carried out by moving the fourth lens group G4 along the optical axis.

The solid-state imaging device C disposed on the image plane I has a diagonal length IH, which is a length from the center to a corner, of 3.75 mm.

Various values associated with the high-zoom-ratio zoom lens according to Example 3 are listed in Table 3.

TABLE 3

[Specifications]

| | W | T |
|---|---|---|
| F = | 6.45 | 73.00 |
| FNO = | 2.8 | 4.7 |

[Lens Data]

| | r | d | vd | nd |
|---|---|---|---|---|
| 1) | 116.7912 | 1.3000 | 31.31 | 1.903660 |
| 2) | 40.1792 | 4.3000 | 82.56 | 1.497820 |
| 3) | −124.5626 | 0.1000 | | |
| 4) | 35.9872 | 3.4000 | 52.30 | 1.748099 |
| 5) | 218.7908 | D5 | | |
| 6) | −403.5813 | 1.0000 | 35.71 | 1.902650 |
| 7) | 6.6834 | 2.7000 | | |
| 8) | −13.7593 | 1.0000 | 31.31 | 1.903660 |
| 9) | −53.1667 | 0.2000 | | |
| 10) | 24.0328 | 2.0000 | 17.98 | 1.945950 |
| 11) | −42.1387 | D11 | | |
| 12> | ∞ | 0.5000 | Aperture Stop S | |
| 13) | 15.0414 | 2.0000 | 59.56 | 1.583130 |
| 14) | −1734.2537 | 0.1000 | | |
| 15) | 7.5312 | 2.4000 | 82.56 | 1.497820 |
| 16) | −57.0133 | 2.6000 | | |
| 17) | −35.4875 | 1.0000 | 25.46 | 2.000690 |
| 18) | 7.1794 | 1.0000 | | |
| 19) | 22.4575 | 2.0000 | 32.35 | 1.850260 |
| 20) | −21.1426 | D20 | | |
| 21) | 12.5185 | 1.7000 | 82.56 | 1.497820 |
| 22) | 49.5554 | D22 | | |
| 23) | ∞ | 1.6500 | 64.14 | 1.516330 |
| 24) | ∞ | 0.4000 | | |
| 25) | ∞ | 0.5000 | 64.14 | 1.516330 |
| 26) | ∞ | Bf | | |

TABLE 3-continued

[Aspherical Data]

Surface Number: 7

κ = 0.7325
C4 = 0.00000E+00
C6 = −1.11620E−06
C8 = 1.29890E−08

Surface Number: 13

κ = −1.3857
C4 = 0.00000E+00
C6 = −8.12450E−07
C8 = 0.00000E+00

[Variable Distances]

| | W | M | T |
|---|---|---|---|
| (Focusing on infinity) | | | |
| F | 6.45456 | 35.00000 | 73.00000 |
| D0 | ∞ | ∞ | ∞ |
| D5 | 1.23769 | 27.99785 | 32.49664 |
| D11 | 21.67699 | 5.70034 | 1.00001 |
| D20 | 3.61860 | 8.28437 | 21.43279 |
| D22 | 4.00252 | 7.21263 | 2.29346 |
| Bf | 2.86208 | 2.86208 | 2.86208 |
| (Focusing on a close-rang object) | | | |
| β | −0.10000 | −0.10000 | −0.10000 |
| D0 | 48.8235 | 244.6934 | 503.016 |
| D5 | 1.23769 | 27.99785 | 32.49664 |
| D11 | 21.67699 | 5.70034 | 1.00001 |
| D20 | 2.43362 | 3.49567 | 10.77801 |
| D22 | 5.18750 | 12.00133 | 12.94824 |
| Bf | 2.86208 | 2.86208 | 2.86208 |

[Values for Conditional Expressions]

(1): N33 = 2.001
(2): ν33 = 25.5
(3): Ra/Rb = −0.009
(4): Rc/Rd = −0.132
(5): Re/Rf = 0.259
(6): N21 = 1.903
(7): ν21 = 35.7

Figure 10A:
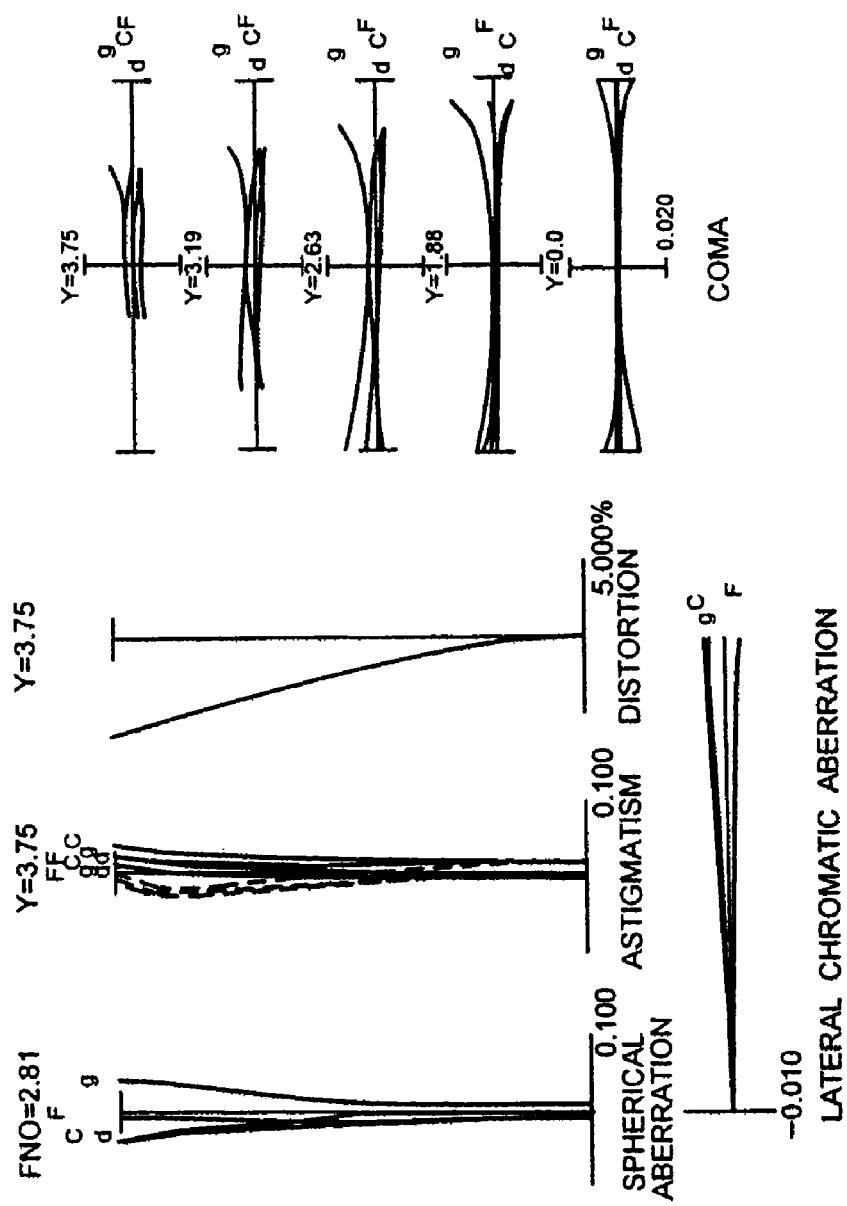
Figure 10B:
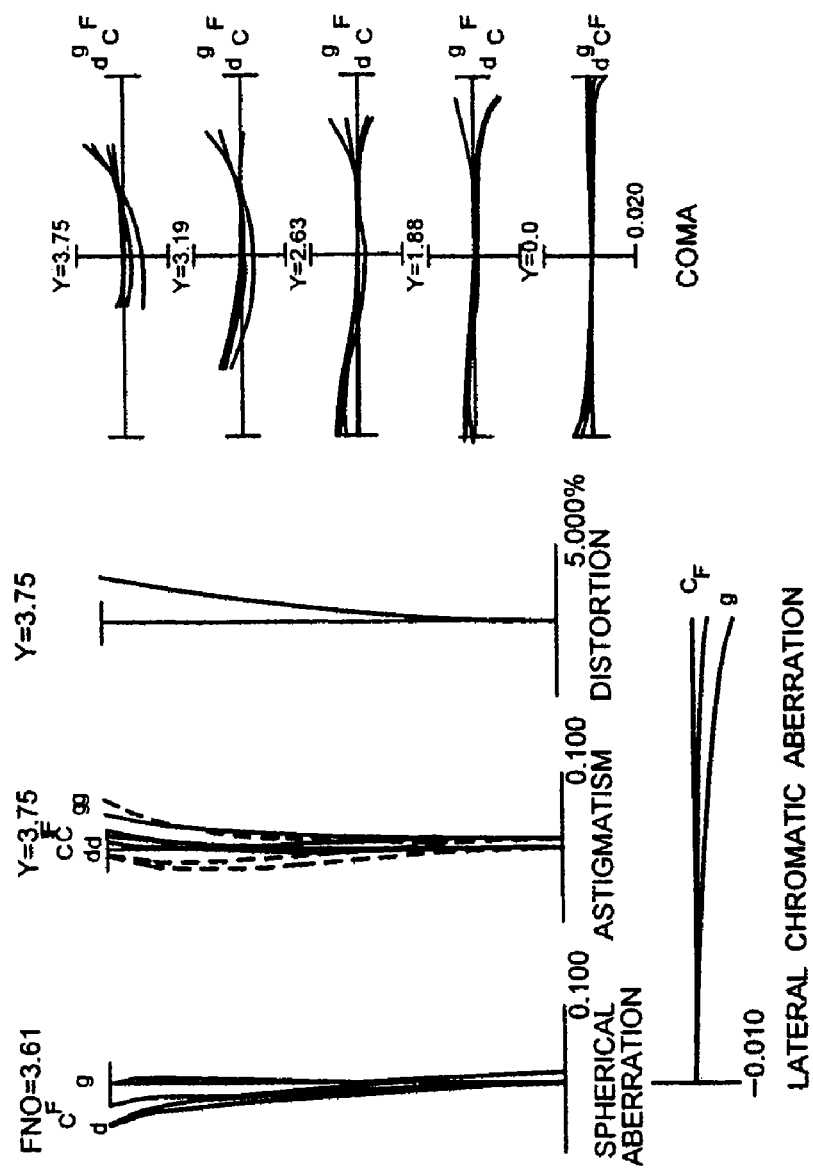
Figure 10C:
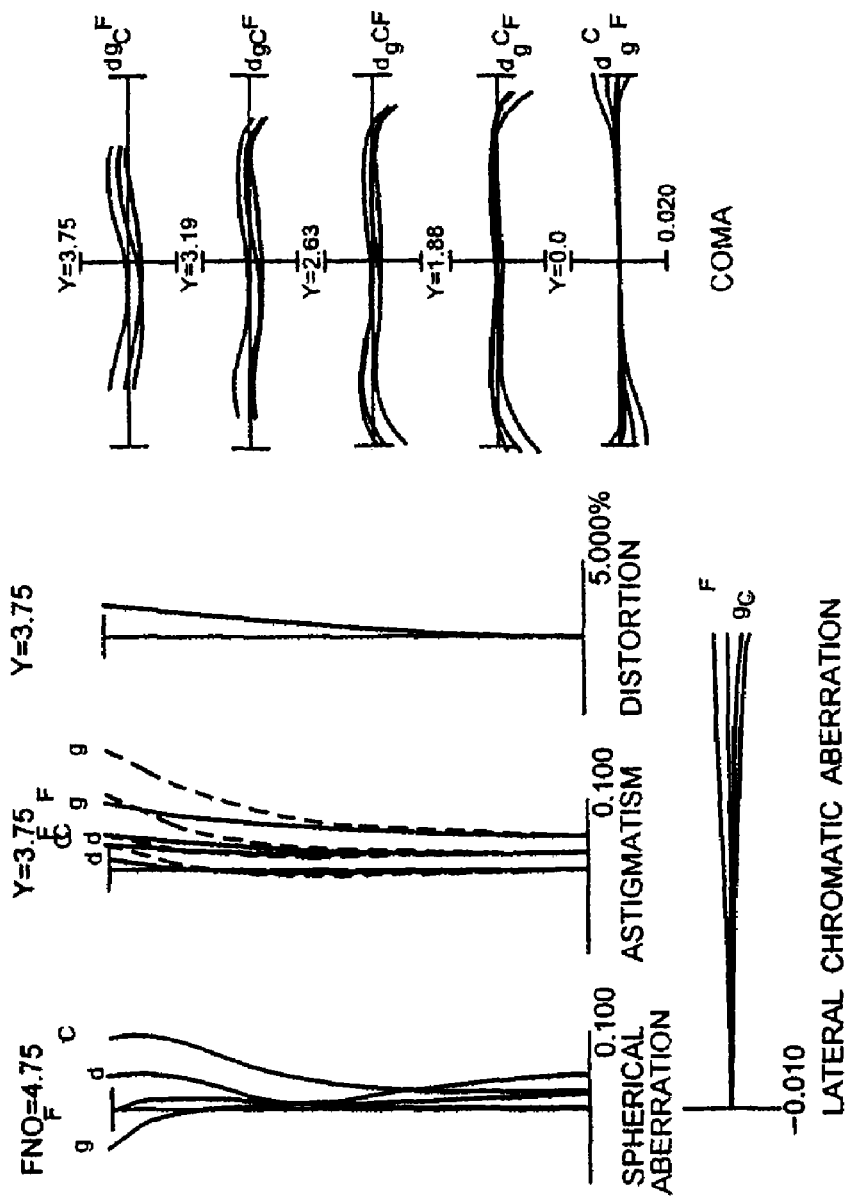
Figure 11A:
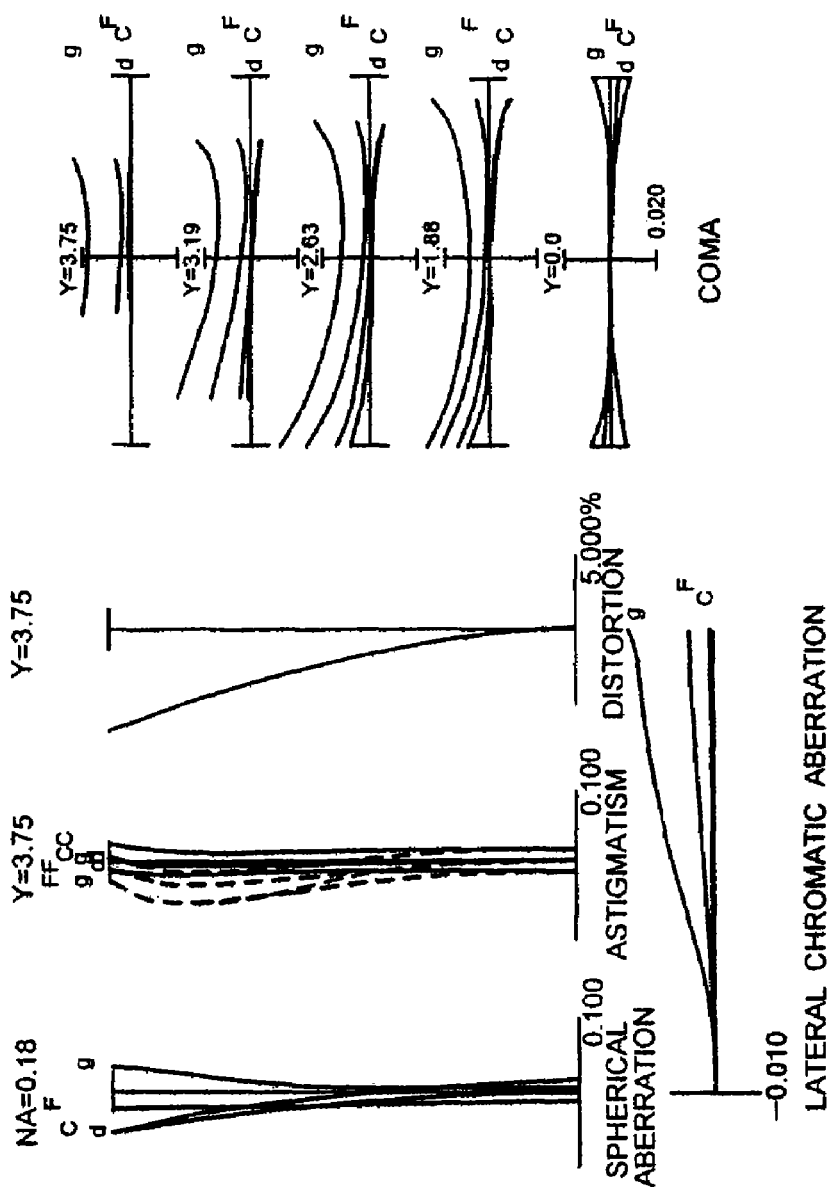
Figure 11B:
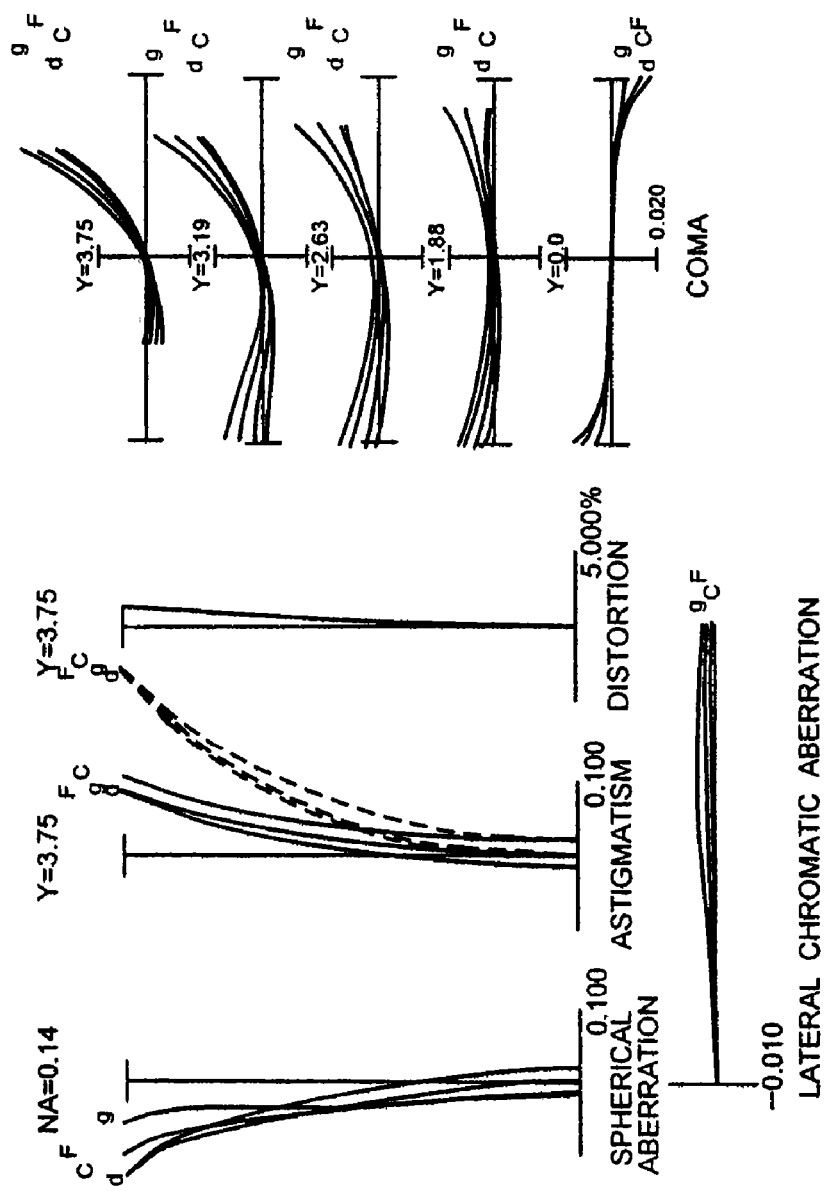
Figure 11C:
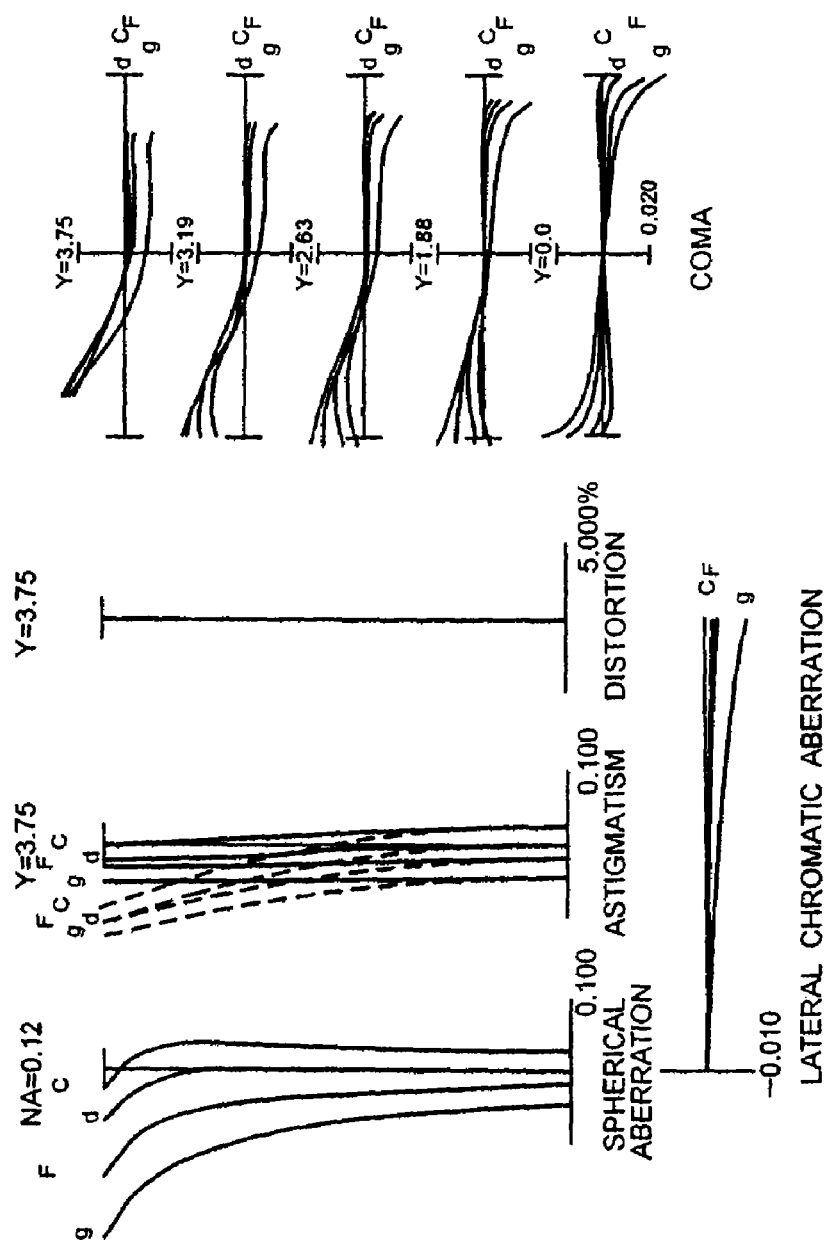

FIGS. 10A, 10B and 10C are graphs showing various aberrations of the high-zoom-ratio zoom lens according to Example 3 upon focusing on infinity, in which FIG. 10A shows in a wide-angle end state, FIG. 10B shows in an intermediate focal length state, and FIG. 10C shows in a telephoto end state. FIGS. 11A, 11B and 11C are graphs showing various aberrations of the high-zoom-ratio zoom lens according to Example 3 upon focusing on close-range object, in which FIG. 11A shows in a wide-angle end state where the distance between the object and the image plane Rw=114 mm, FIG. 11B shows in an intermediate focal length state where the distance between the object and the image plane Rm=329 mm, and FIG. 11C shows in a telephoto end state where the distance between the object and the image plane Rt=595 mm.

As is apparent from the respective graphs, the high-zoom-ratio zoom lens according to Example 3 shows superb optical performance as a result of good corrections to various aberrations over entire zooming range from the wide-angle end state W to the telephoto end state T.

EXAMPLE 4

Figure 12:
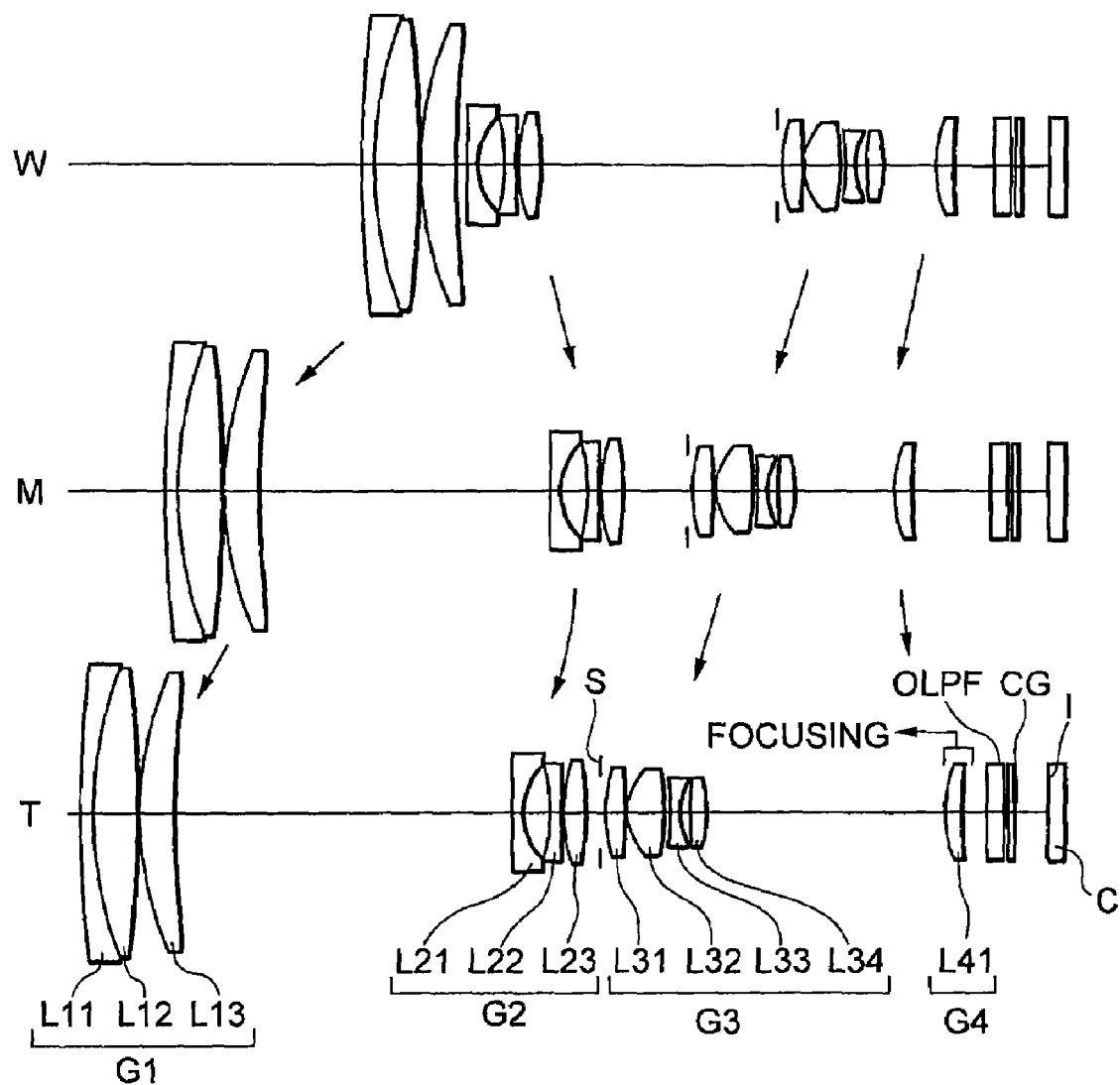
FIG. 12 is a diagram showing a lens configuration of a high-zoom-ratio zoom lens according to Example 4, in which W denotes a wide-angle end state, M denotes an intermediate focal length state, and T denotes a telephoto end state.

FIG. 12 is a diagram showing a lens configuration of a high-zoom-ratio zoom lens according to Example 4, in which W denotes a wide-angle end state, M denotes an intermediate focal length state, and T denotes a telephoto end state. Reference symbols are attached only to a diagram showing the telephoto end state.

In FIG. 12, the high-zoom-ratio zoom lens according to Example 4 is composed of, in order from an object, a first lens group G1 having positive refractive power, a second lens group G2 having negative refractive power, an aperture stop S, a third lens group G3 having positive refractive power, and a fourth lens group G4 having positive refractive power. Upon zooming from a wide-angle end state W to a telephoto end state T, the first lens group G1 is moved toward the object side, the second lens group G2 is moved along a trajectory having a concave shape facing the object, the third lens group G3 is moved toward the object side, and the fourth lens group is moved along a trajectory having a convex shape facing the object.

The first lens group G1 is composed of, in order from the object, a cemented lens constructed by a negative meniscus lens L11 having a convex surface facing the object cemented with a double convex positive lens L12, and a positive meniscus lens L13 having a convex surface facing the object.

The second lens group G2 is composed of, in order from the object, a double concave negative lens L21 having an absolute value of a radius of curvature of the image side surface smaller than that of the object side surface, a double concave negative lens L22, and a double convex positive lens L23. The image plane I side surface of the negative lens L21 is an aspherical surface.

The third lens group G3 is composed of, in order from the object, a double convex positive lens L31, a double convex positive lens L32, a double concave negative lens L33 having an absolute value of a radius of curvature of the image side surface smaller than that of the object side surface, and a double convex positive lens L34. The object side surface of the positive lens L31 is an aspherical surface.

The fourth lens group G4 is composed of a positive meniscus lens L41 having a convex surface facing the object.

Between the fourth lens group G4 and the image plane I, there are provided an optical low-pass filter OLPF and a cover glass CG for a solid-state imaging device C.

An aperture stop S is disposed in the vicinity of the most object side lens in the third lens group, and moved together with the third lens group G3 upon zooming from the wide-angle end state W to the telephoto end state T.

Focusing from infinity to a close-range object is carried out by moving the fourth lens group G4 along the optical axis.

The solid-state imaging device C disposed on the image plane I has a diagonal length IH, which is a length from the center to a corner, of 3.75 mm.

Various values associated with the high-zoom-ratio zoom lens according to Example 4 are listed in Table 4.

TABLE 4

[Specifications]

|  | W | T |
|---|---|---|
| F = | 6.45 | 73.00 |
| FNO = | 2.9 | 4.9 |

[Lens Data]

|  | r | d | vd | nd |
|---|---|---|---|---|
| 1) | 148.3206 | 1.3000 | 31.31 | 1.903660 |
| 2) | 43.5184 | 4.3000 | 82.56 | 1.497820 |
| 3) | −85.8885 | 0.1000 | | |

TABLE 4-continued

| | | | | |
|---|---|---|---|---|
| 4) | 34.4697 | 3.4000 | 52.30 | 1.748099 |
| 5) | 137.5473 | D5 | | |
| 6) | −419.8650 | 1.0000 | 40.77 | 1.883000 |
| 7) | 6.6692 | 2.7000 | | |
| 8) | −13.7456 | 1.0000 | 46.63 | 1.816000 |
| 9) | 741.6137 | 0.2000 | | |
| 10) | 21.2415 | 2.0000 | 23.82 | 1.846660 |
| 11) | −27.5161 | D11 | | |
| 12> | ∞ | 0.5000 | Aperture Stop S | |
| 13) | 12.9073 | 2.0000 | 59.56 | 1.583130 |
| 14) | −57.0734 | 0.1000 | | |
| 15) | 6.2516 | 3.4000 | 91.20 | 1.456000 |
| 16) | −24.9367 | 0.6000 | | |
| 17) | −24.0879 | 1.0000 | 35.71 | 1.902650 |
| 18) | 6.0664 | 1.0000 | | |
| 19) | 36.9859 | 2.0000 | 65.42 | 1.603001 |
| 20) | −15.2842 | D20 | | |
| 21) | 12.5430 | 1.7000 | 82.56 | 1.497820 |
| 22) | 49.9643 | D22 | | |
| 23) | ∞ | 1.6500 | 64.14 | 1.516330 |
| 24) | ∞ | 0.4000 | | |
| 25) | ∞ | 0.5000 | 64.14 | 1.516330 |
| 26) | ∞ | Bf | | |

[Aspherical Data]

Surface Number: 7

κ = 0.7809
C4 = 0.00000E+00
C6 = 5.37620E−07
C8 = −1.95160E−08

Surface Number: 13

κ = −0.3875
C4 = 0.00000E+00
C6 = −3.96580E−07
C8 = 0.00000E+00

[Variable Distances]

| | W | M | T |
|---|---|---|---|
| (Focusing on infinity) | | | |
| F | 6.45456 | 35.00000 | 73.00000 |
| D0 | ∞ | ∞ | ∞ |
| D5 | 1.23770 | 27.99786 | 32.49665 |
| D11 | 22.34738 | 6.37073 | 1.67040 |
| D20 | 4.27526 | 8.94103 | 22.08945 |
| D22 | 4.00252 | 7.21263 | 2.29346 |
| Bf | 2.86500 | 2.86500 | 2.86500 |
| (Focusing on a close-rang object) | | | |
| β | −0.10000 | −0.10000 | −0.10000 |
| D0 | 48.8564 | 244.7263 | 503.0493 |
| D5 | 1.23770 | 27.99786 | 32.49665 |
| D11 | 22.34738 | 6.37073 | 1.67040 |
| D20 | 3.09028 | 4.15233 | 11.43467 |
| D22 | 5.18750 | 12.00133 | 12.94824 |
| Bf | 2.86500 | 2.86500 | 2.86500 |

[Values for Conditional Expressions]

(1): N33 = 1.903
(2): ν33 = 35.7
(3): Ra/Rb = −0.226
(4): Rc/Rd = −0.251
(5): Re/Rf = −0.019
(6): N21 = 1.883
(7): ν1 = 40.8

Figure 13A:
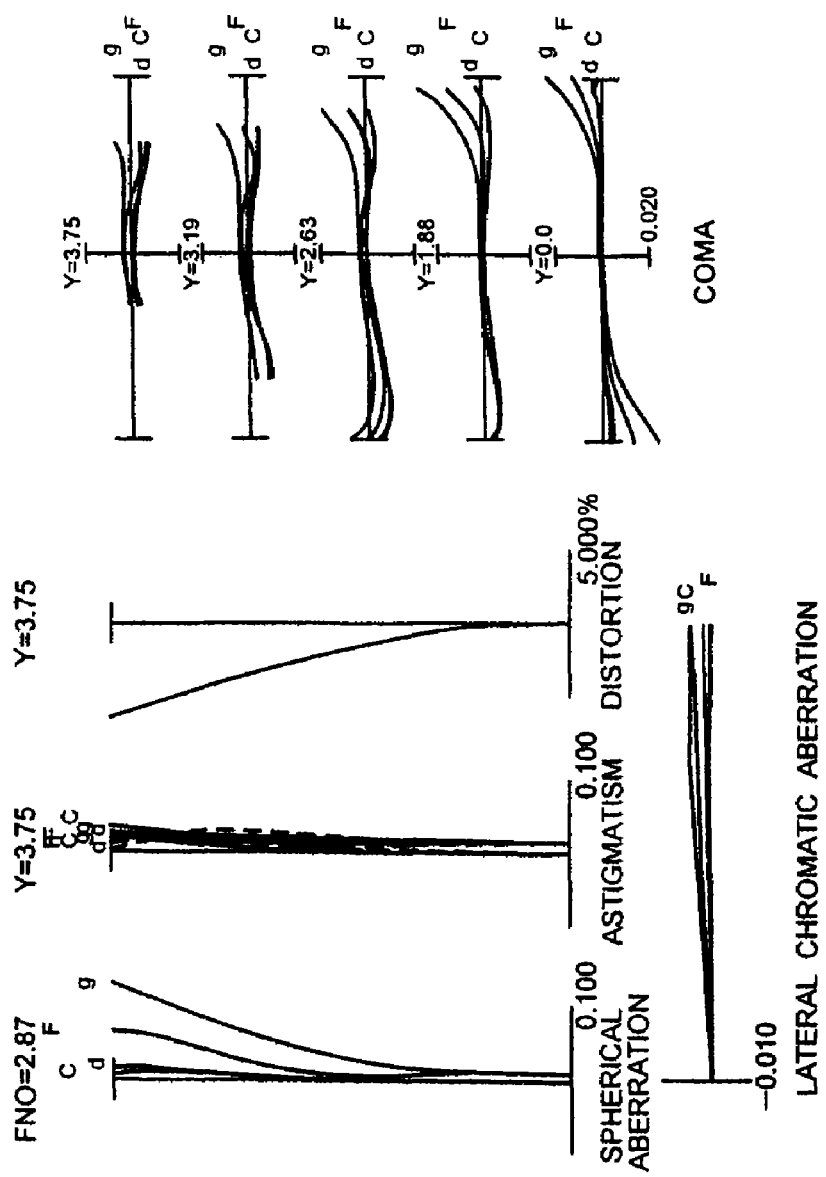
Figure 13B:
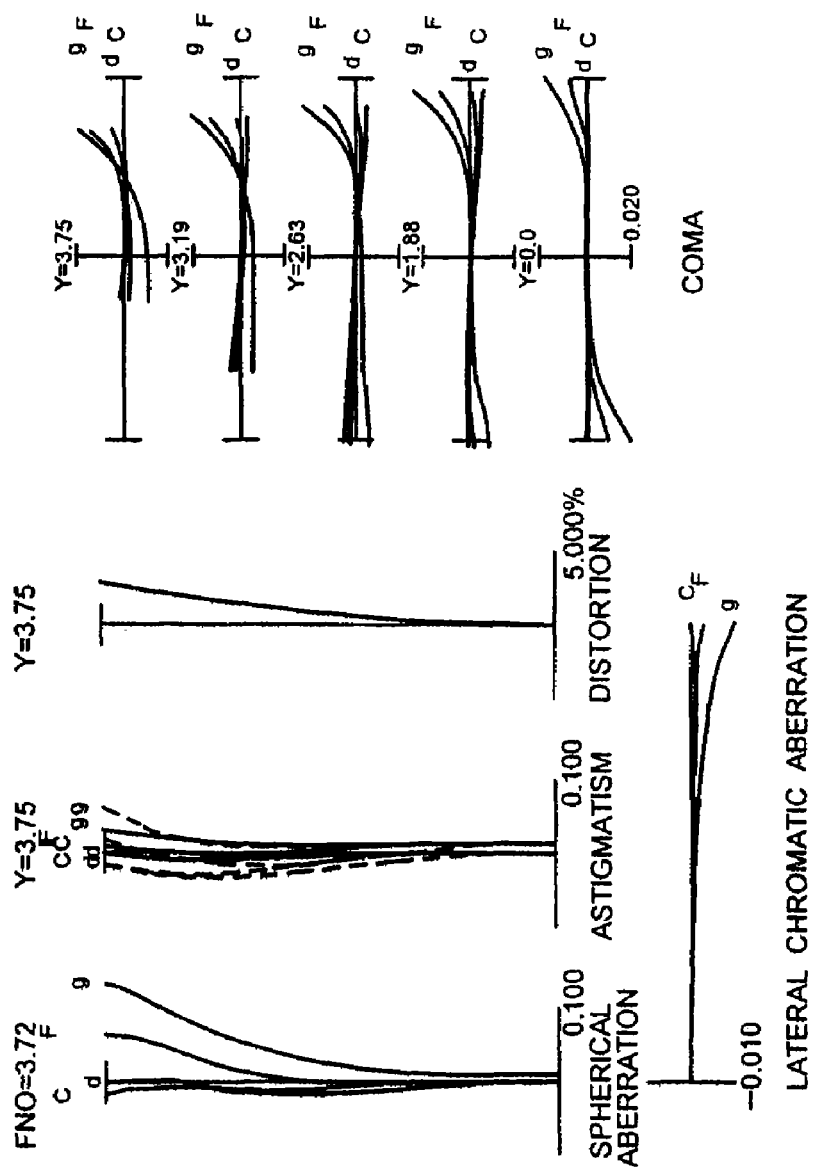
Figure 13C:
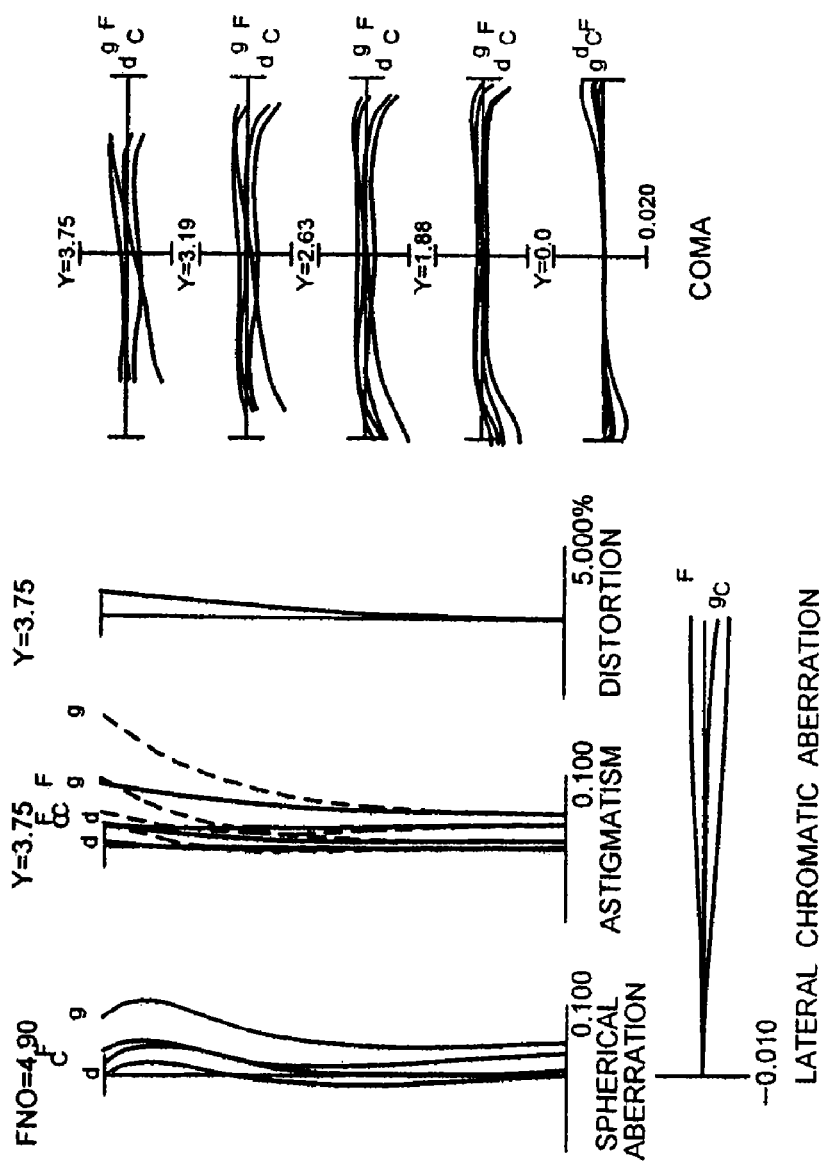
Figure 14A:
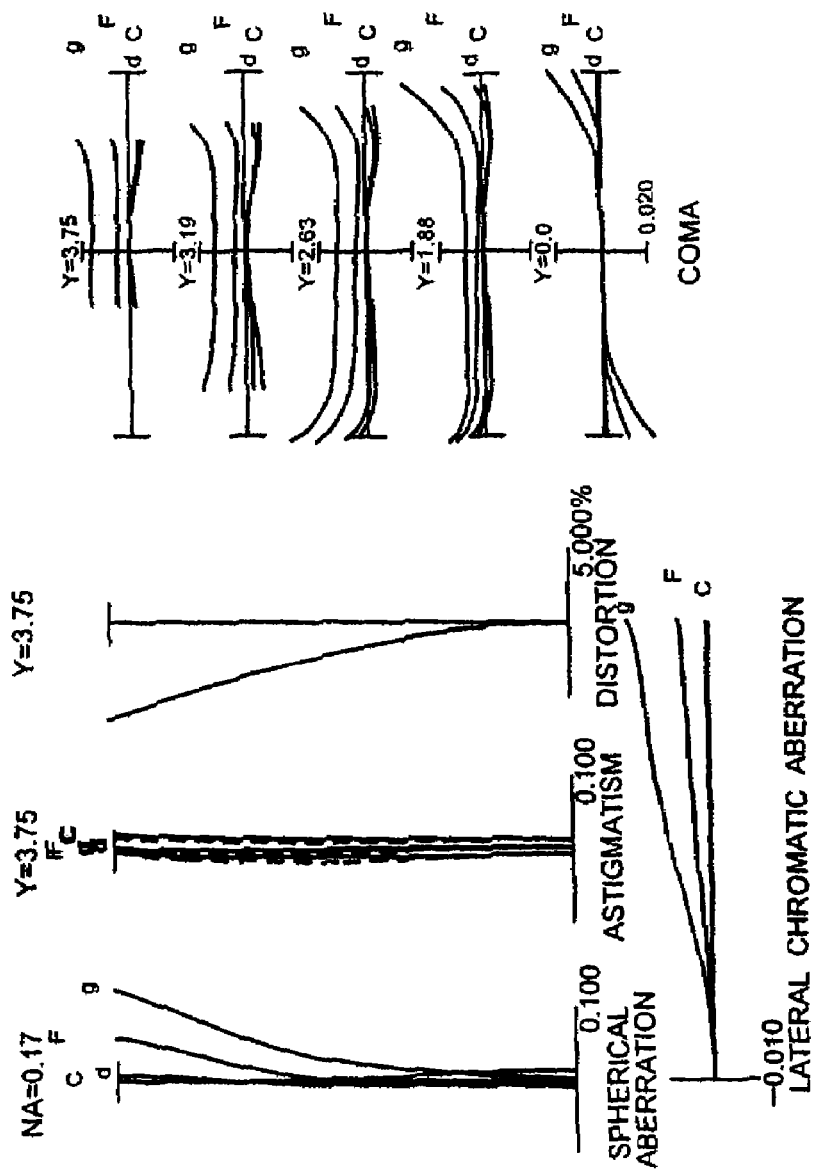
Figure 14B:
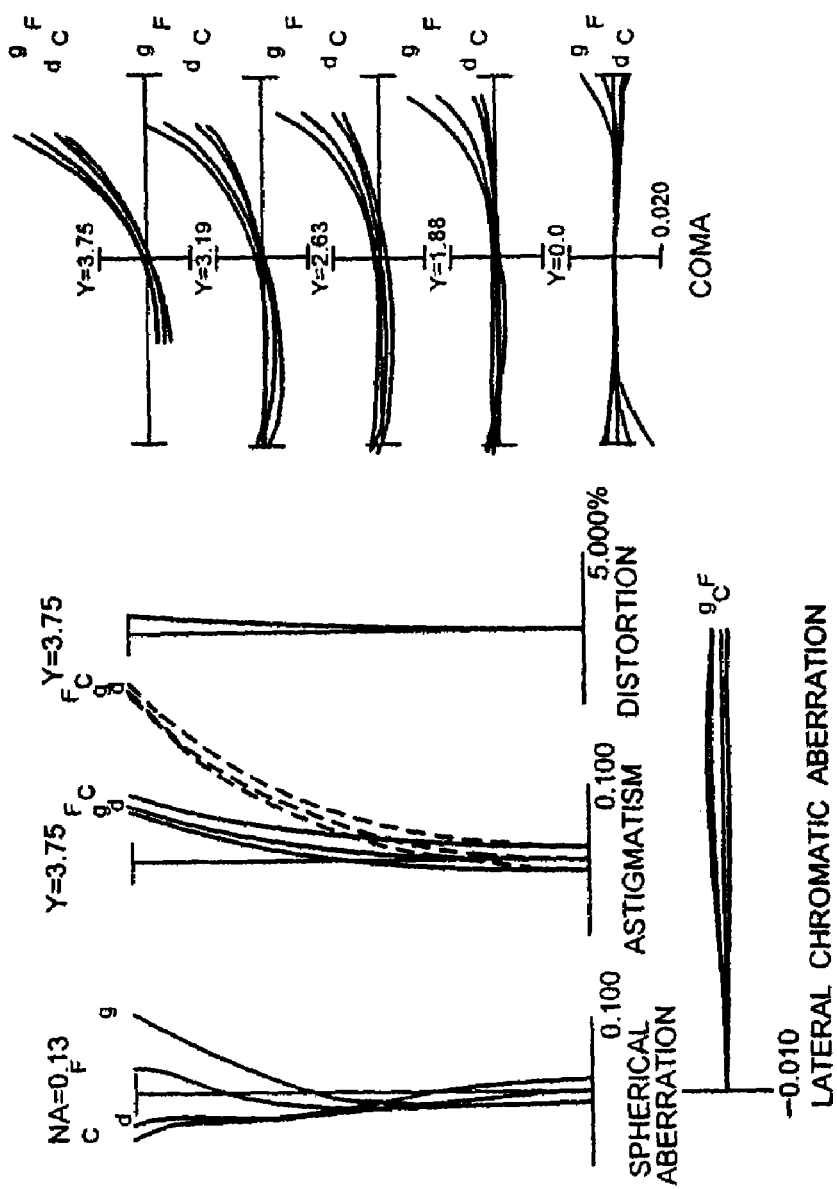
Figure 14C:
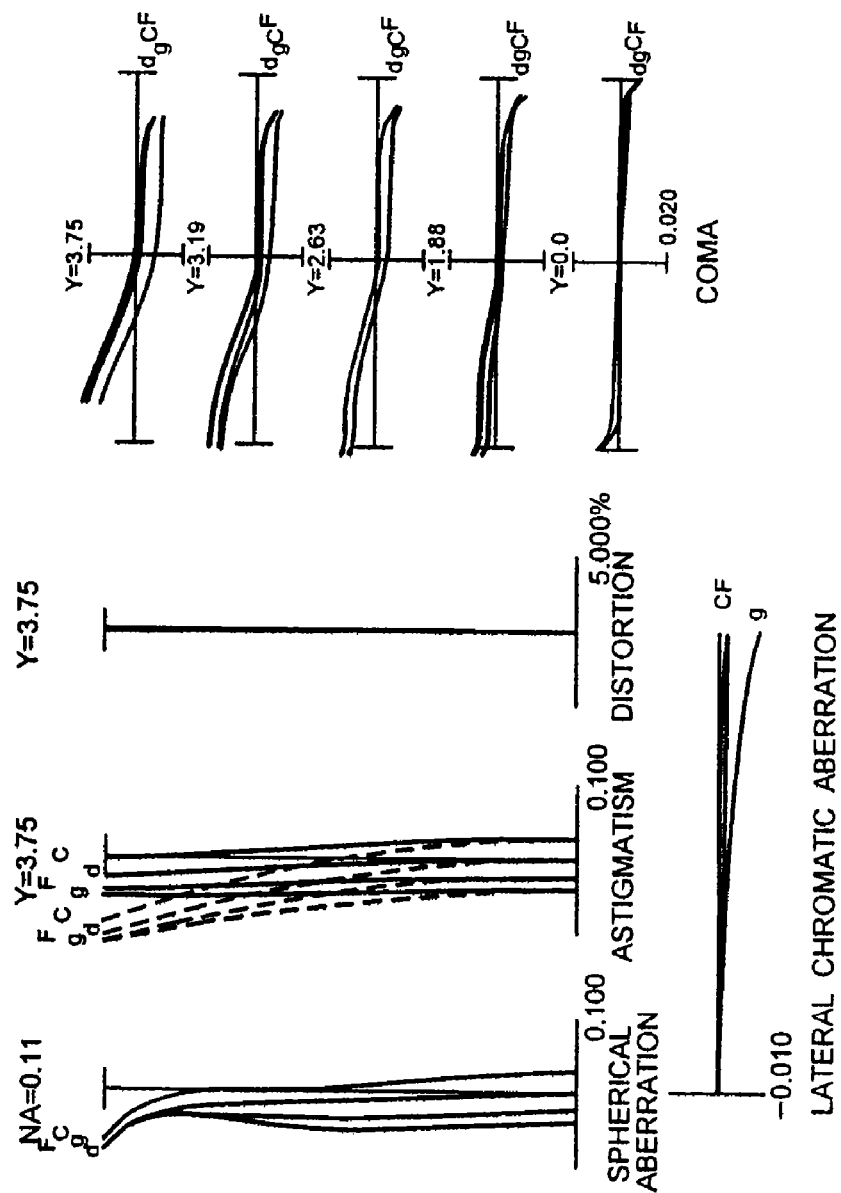

FIGS. 13A, 13B and 13C are graphs showing various aberrations of the high-zoom-ratio zoom lens according to Example 4 upon focusing on infinity, in which FIG. 13A shows in a wide-angle end state, FIG. 13B shows in an intermediate focal length state, and FIG. 13C shows in a telephoto end state. FIGS. 14A, 14B and 14C are graphs showing various aberrations of the high-zoom-ratio zoom lens according to Example 4 upon focusing on close-range object, in which FIG. 14A shows in a wide-angle end state where the distance between the object and the image plane Rw=114 mm, FIG. 14B shows in an intermediate focal length state where the distance between the object and the image plane Rm=329 mm, and FIG. 14C shows in a telephoto end state where the distance between the object and the image plane Rt=595 mm.

As is apparent from the respective graphs, the high-zoom-ratio zoom lens according to Example 4 shows superb optical performance as a result of good corrections to various aberrations over entire zooming range from the wide-angle end state W to the telephoto end state T.

In Example 1, an image blur caused by a camera shake is corrected by decentering the third lens group G3 in a direction perpendicular to the optical axis. In the other Examples also, an image blur caused by a camera shake can be corrected by decentering the third lens group G3 in a direction perpendicular to the optical axis. Not only the third lens group G3 as a whole, but any lens or lens group in the above described Examples may be shifted in a direction perpendicular to the optical axis so as to shift the image. Moreover, in order to correct chromatic aberration upon shooting a close-range object, the fourth lens group G4 may be a cemented lens constructed by a positive lens cemented with a negative lens forming a so-called achromatic lens.

Incidentally, the following description may suitably be applied within limits that do not deteriorate optical performance.

In each Example, although a four-group configuration is shown, it can be applicable to any other configurations such as a five-group configuration.

In each Example, in order to carry out focusing from infinity to a close-rang object, a portion of a lens group, a single lens group, or a plurality of lens groups may be moved along the optical axis. The focusing lens group(s) may be used for auto focus, and suitable for being driven by a motor such as an ultrasonic motor. In a high-zoom-ratio zoom lens according to each Example, the first lens group may be used for the focusing lens group.

In a zoom lens system according to each Example, in order to correct an image blur caused by a camera shake, a portion of a lens group, or a single lens group may be moved as a vibration reduction lens group in a direction perpendicular to the optical axis. In a high-zoom-ratio zoom lens according to each Example of the present application, it is preferable that the third lens group is used for the vibration reduction lens group.

Moreover, any lens surface may be formed as an aspherical surface. The aspherical surface may be fabricated by a fine grinding process, a glass molding process that a glass material is formed into an aspherical shape by a mold, or a compound type process that a resin material is formed into an aspherical shape on a glass surface.

In the high-zoom-ratio zoom lens according to each Example, an antireflection coating having high transmittance over a broad wavelength range may be applied to each lens surface to reduce flare or ghost images, so that high optical performance with a high contrast can be attained.

As described above, the present embodiment makes it possible to provide a high-zoom-ratio zoom lens having high optical performance in spite of a half angle of view in the telephoto end state of 3.0 degrees or less, a zoom ratio of 10 or more, and a f-number in the telephoto end state of 5 or less. Moreover, the present embodiment makes it possible to provide an optical apparatus using the high-zoom-ratio zoom lens, and a method for varying a focal length of the high-zoom-ratio zoom lens.

The invention in its broader aspect is not limited to the specific details, and representative devices shown and described herein. Accordingly, various modifications may be made without departing from the spirit or scope of the general inventive concept as defined by the appended claims and their equivalents.

What is claimed is:

1. A high-zoom-ratio zoom lens comprising, in order from an object:
a first lens group having positive refractive power;
a second lens group having negative refractive power;
a third lens group having positive refractive power; and
a fourth lens group having positive refractive power,
the third lens group including, in order from the object, a first positive lens having a convex surface facing the object, a second positive lens having a convex surface facing the object, a double concave negative lens having an absolute value of a radius of curvature of the image side surface smaller than that of the object side surface, and a third positive lens having a double convex shape,
upon varying a focal length from a wide-angle end state to a telephoto end state, a distance between the first lens group and the second lens group varying, a distance between the second lens group and the third lens group varying, and a distance between the third lens group and the fourth lens group varying, and
the following conditional expression being satisfied:

$1.87<N33<2.20$ where N33 denotes refractive index of the negative lens at d-line, in which the wavelength λ=587.6 nm.

2. The high-zoom-ratio zoom lens according to claim 1, wherein the following conditional expression is satisfied:

$22<v33<39$ where v33 denotes Abbe number of the negative lens at d-line, in which the wavelength λ=587.6 nm.

3. The high-zoom-ratio zoom lens according to claim 1, wherein the following conditional expressions are satisfied:

$-0.30<Ra/Rb<0.10$ $-0.30<Rc/Rd<0.10$ where Ra denotes a radius of curvature of the object side lens surface of the first positive lens, Rb denotes a radius of curvature of the image side lens surface of the first positive lens, Rc denotes a radius of curvature of the object side lens surface of the second positive lens, and Rd denotes a radius of curvature of the image side lens surface of the second positive lens.

4. The high-zoom-ratio zoom lens according to claim 1, wherein any of lens surfaces composing the third lens group is an aspherical surface.

5. The high-zoom-ratio zoom lens according to claim 1, wherein the second lens group includes, in order from the object, a first negative lens with a double concave shape having an absolute value of a radius of curvature of the image side lens surface smaller than that of the object side lens surface, a second negative lens having a concave surface facing the object, and a double convex positive lens.

6. The high-zoom-ratio zoom lens according to claim 1, wherein any of lens surfaces composing the second lens group is an aspherical surface.

7. The high-zoom-ratio zoom lens according to claim 1, wherein the following conditional expression is satisfied:

$$-0.30 < Re/Rf < 0.40$$

where Re denotes a radius of curvature of the object side lens surface of the second negative lens, and Rf denotes a radius of curvature of the image side lens surface of the second negative lens.

8. The high-zoom-ratio zoom lens according to claim 1, wherein the following conditional expressions are satisfied:

$$1.820 < N21 < 1.920$$

$$33 < v21 < 44$$

where N21 denotes refractive index of the first negative lens at d-line, in which the wavelength $\lambda = 587.6$ nm, and v21 denotes Abbe number of the first negative lens at d-line, in which the wavelength $\lambda = 587.6$ nm.

9. The high-zoom-ratio zoom lens according to claim 1, wherein upon varying a focal length from the wide-angle end state to the telephoto end state, the first lens group and the third lens group are moved toward the object along the optical axis.

10. The high-zoom-ratio zoom lens according to claim 1, wherein upon varying a focal length from the wide-angle end state to the telephoto end state, the second lens group is moved along a trajectory having a concave shape facing the object.

11. The high-zoom-ratio zoom lens according to claim 1, wherein upon varying a focal length from the wide-angle end state to the telephoto end state, the fourth lens group is moved along a trajectory having a convex shape facing the object.

12. The high-zoom-ratio zoom lens according to claim 1, wherein all lenses in the third lens group are disposed with an air space in between.

13. The high-zoom-ratio zoom lens according to claim 1, wherein the object side lens surface of the first positive lens in the third lens group is an aspherical surface.

14. The high-zoom-ratio zoom lens according to claim 1, wherein all lenses in the second lens group are disposed with an air space in between.

15. The high-zoom-ratio zoom lens according to claim 1, wherein the image side lens surface of the first negative lens in the second lens group is an aspherical surface.

16. The high-zoom-ratio zoom lens according to claim 1, wherein upon focusing from infinity to a close-range object, the fourth lens group is moved along the optical axis.

17. The high-zoom-ratio zoom lens according to claim 1, wherein the image on the image plane can be shifted by moving the third lens group in a direction substantially perpendicular to the optical axis.

18. An optical apparatus equipped with the high-zoom-ratio zoom lens according to any of claims 1 through 17.

19. A method for varying a focal length of a high-zoom-ratio zoom lens, the method comprising steps of:
providing the high-zoom-ratio zoom lens including, in order from an object, a first lens group having positive refractive power, a second lens group having negative refractive power, a third lens group having positive refractive power, and a fourth lens group having positive refractive power;
providing the third lens group including, in order from the object, a first positive lens having a convex surface facing the object, a second positive lens having a convex surface facing the object, a double concave negative lens having an absolute value of a radius of curvature of the image side surface smaller than that of the object side surface, and a third positive lens having a double convex shape;
satisfying the following conditional expression:

$$1.87 < N33 < 2.20$$

where N33 denotes refractive index of the negative lens at d-line, in which the wavelength $\lambda = 587.6$ nm; and
varying a focal length from a wide-angle end state to a telephoto end state by varying a distance between the first lens group and the second lens group, varying a distance between the second lens group and the third lens group, and varying a distance between the third lens group and the fourth lens group.

20. The method according to claim 19, further comprising a step of:
satisfying the following conditional expression:

$$22 < v33 < 39$$

where v33 denotes Abbe number of the negative lens at d-line, in which the wavelength $\lambda = 587.6$ nm.

21. The method according to claim 19, further comprising a step of:
satisfying the following conditional expressions:

$$-0.30 < Ra/Rb < 0.10$$

$$-0.30 < Rc/Rd < 0.10$$

where Ra denotes a radius of curvature of the object side lens surface of the first positive lens, Rb denotes a radius of curvature of the image side lens surface of the first positive lens, Rc denotes a radius of curvature of the object side lens surface of the second positive lens, and Rd denotes a radius of curvature of the image side lens surface of the second positive lens.

22. The method according to claim 19, further comprising a step of:
providing the third lens group, in which any of lens surfaces composing the third lens group is an aspherical surface.

* * * * *